(12) United States Patent
Shao et al.

(10) Patent No.: US 12,380,094 B2
(45) Date of Patent: Aug. 5, 2025

(54) TRANSACTION PROCESSING METHOD AND APPARATUS

(71) Applicant: Tencent Technology (Shenzhen) Company Limited, Guangdong (CN)

(72) Inventors: Zhuguang Shao, Shenzhen (CN); Li Li, Shenzhen (CN); Jianjun Zhang, Shenzhen (CN); Bing Shao, Shenzhen (CN); Bengbeng Su, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 18/638,025

(22) Filed: Apr. 17, 2024

(65) Prior Publication Data

US 2024/0265009 A1      Aug. 8, 2024

Related U.S. Application Data

(63) Continuation of application No. PCT/CN2023/090469, filed on Apr. 25, 2023.

(30) Foreign Application Priority Data

Jul. 19, 2022   (CN) .......................... 202210848919.0

(51) Int. Cl.
*G06F 16/23*      (2019.01)
*G06F 16/215*     (2019.01)

(52) U.S. Cl.
CPC ........ *G06F 16/2379* (2019.01); *G06F 16/215* (2019.01)

(58) Field of Classification Search
CPC ........................... G06F 16/2379; G06F 16/215

(Continued)

(56) References Cited

U.S. PATENT DOCUMENTS

2020/0278963 A1\* 9/2020 Destefanis ............ H04L 9/3239
2020/0410491 A1\* 12/2020 Ronnow ............. H04L 63/1441
2022/0197306 A1\* 6/2022 Cella ................ G05B 19/41865

FOREIGN PATENT DOCUMENTS

CN        110503558 A       11/2019
CN        111445333 A        7/2020
(Continued)

OTHER PUBLICATIONS

International Search Report issued on international application number PCT/CN2023/090469 on Jul. 19, 2023 and English translation appended; 9 pages.

*Primary Examiner* — Cam Linh T Nguyen
(74) *Attorney, Agent, or Firm* — Crowell & Moring LLP

(57) ABSTRACT

The present disclosure relates to a transaction processing method and apparatus. The transaction processing method includes: obtaining a first block to be uploaded; when it is determined that the first block meets a first capacity expansion condition, determining, from nodes of the blockchain and based on the first capacity expansion condition, a first node for performing filter expansion; obtaining a first capacity-expanded filter from the first node, a capacity of the first capacity-expanded filter being greater than a capacity of a first in-process filter in the execution node, and the first capacity-expanded filter being generated by the first node based on transactions having been uploaded to the blockchain; and loading a transaction in the first block to the first capacity-expanded filter, and using the first capacity-expanded filter as a second in-process filter, to perform, through the capacity-expanded second in-process filter, deduplication filtering on transactions to be uploaded to the blockchain.

20 Claims, 17 Drawing Sheets

(58) Field of Classification Search
USPC .......................................................... 707/692
See application file for complete search history.

(56)  References Cited

FOREIGN PATENT DOCUMENTS

CN           114218179 A      3/2022
WO     WO 2020253111 A1    12/2020

* cited by examiner

TRANSACTION PROCESSING METHOD AND APPARATUS

RELATED APPLICATION

This application is a continuation application of PCT Patent Application No. PCT/CN2023/090469, filed on Apr. 25, 2023, which claims priority to Chinese Patent Application No. 202210848919.0, filed with the China National Intellectual Property Administration on Jul. 19, 2022, and entitled "TRANSACTION PROCESSING METHOD AND APPARATUS, ELECTRONIC DEVICE, AND COMPUTER-READABLE STORAGE MEDIUM", wherein the content of the above-referenced applications is incorporated herein by reference in its entirety.

FIELD OF THE TECHNOLOGY

The present disclosure relates to the field of computer and Internet technologies, and in particular, to transaction processing.

BACKGROUND OF THE DISCLOSURE

In a blockchain system, the same transaction is not allowed to be repeated, and repeated transactions cause a problem of "double spending". Generally, a sum of money is spent twice, which is absolutely not allowed in a blockchain. In view of this, all blockchain systems perform a deduplication operation on transactions, to ensure that there is no duplication between the uploaded transactions.

Transaction deduplication is to judge whether the transaction exists in a ledger of a current node.

Currently, a commonly used method in the industry is to use a filter (for example, a Bloom filter) to perform transaction filtering. However, the Bloom filter has a disadvantage. As a quantity of transactions increases, a misjudgment rate becomes higher. When the quantity of transactions reaches a scale, the misjudgment rate of the Bloom filter is very high. In this case, most transactions are misjudged, losing meaning of the filter.

Based on the above, how to improve accuracy of deduplication filtering of the filter becomes an urgent problem to be addressed.

SUMMARY

An objective of the present disclosure is to provide a transaction processing method and apparatus, an electronic device, a computer-readable storage medium, and a program product, to improve deduplication accuracy of a node.

Other features and advantages of the present disclosure become clear through the following detailed descriptions or partially learned through practice of the present disclosure.

An embodiment of the present disclosure provides a transaction processing method, including: obtaining a first block to be uploaded to a blockchain; and when it is determined that the first block meets a first capacity expansion condition, determining, from nodes of the blockchain and based on the first capacity expansion condition, a first node for performing filter expansion;

obtaining a first capacity-expanded filter from the first node, a capacity of the first capacity-expanded filter being greater than a capacity of a first in-process filter in an execution node, and the first capacity-expanded filter being generated by the first node based on transactions having been uploaded to the blockchain; and loading a transaction in the first block to the first capacity-expanded filter, and using the first capacity-expanded filter as a second in-process filter, to perform, through the second in-process filter, deduplication filtering on transactions to be uploaded to the blockchain.

An embodiment of the present disclosure provides a transaction processing apparatus, including: a first block obtaining module, a first node determining module, a first capacity-expanded filter determining module, and a first block loading module.

The first block obtaining module is configured to obtain a first block to be uploaded to a blockchain. The first node determining module is configured to: when it is determined that the first block meets a first capacity expansion condition, determine, from nodes of the blockchain and based on the first capacity expansion condition, a first node for performing filter expansion. The first capacity-expanded filter determining module is configured to obtain a first capacity-expanded filter from the first node, where a capacity of the first capacity-expanded filter is greater than a capacity of a first in-process filter in an execution node, and the first capacity-expanded filter is generated by the first node based on transactions having been uploaded to the blockchain. The first block loading module is configured to load a transaction in the first block to the first capacity-expanded filter, and use the first capacity-expanded filter as a second in-process filter, to perform, through the second in-process filter, deduplication filtering on transactions to be uploaded to the blockchain.

An embodiment of the present disclosure provides an electronic device, where the electronic device includes one or more processors; and a storage apparatus configured to store one or more computer programs. When executed by the one or more processors, the one or more computer programs, cause the one or more processors to implement the transaction processing methods according to any one described above.

An embodiment of the present disclosure provides a computer-readable storage medium, having a computer program stored therein, when executed by a processor, being configured for implementing the transaction processing methods according to any one described above.

Embodiments of the present disclosure provide a computer program product having a computer program, the computer program, when run on a computer, causing the computer device to perform the foregoing transaction processing method.

Based on the transaction processing method and apparatus, the electronic device, and the computer-readable storage medium provided in embodiments of the present disclosure, on one hand, when the first block meets the capacity expansion conditions, the execution node can implement capacity expansion on the filter timely, and continue to perform deduplication filtering based on the expanded filter, to improve deduplication accuracy of the execution node. On the other hand, the capacity-expanded filter is constructed by using other nodes in the blockchain, which does not occupy resources of the execution node, and does not generate any impact on a service (for example, a deduplication filtering service) of the execution node. This improves the deduplication accuracy rate for those nodes having lower performance (for example, nodes having fewer cores) without affecting the service of the node itself.

The foregoing general descriptions and the following detailed descriptions are merely exemplary, and cannot limit the present disclosure.

DESCRIPTION OF EMBODIMENTS

Figure 1A:
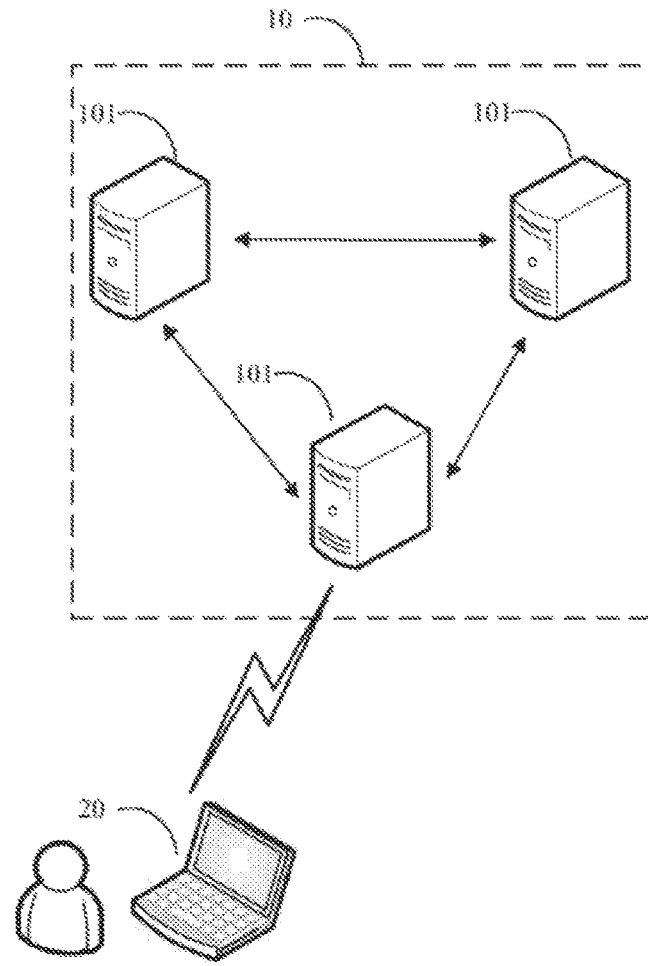
FIG. 1A is a schematic architectural diagram of a transaction processing system according to an embodiment of this application.

Exemplary embodiments are described comprehensively with reference to the accompanying drawings. However, the exemplary embodiments may be implemented in various forms and are not to be understood as being limited to the embodiments described herein. Conversely, the embodiments are provided to make technical solution of the present disclosure more comprehensive and complete, and comprehensively convey an idea of the embodiments to a person skilled in the art. The same reference numeral in the accompanying drawings represents same or similar components, and therefore repeated descriptions of the components are omitted.

Features, structures, or characteristics described in the present disclosure may be combined in one or more of implementations in any appropriate manner. In the following description, many specific details are provided to enable a person skilled in the art to fully understand implementations of the present disclosure. However, a person skilled in the art is to be aware that, technical solutions in the present disclosure may be implemented without one or more of particular details, or another method, component, apparatus, or operation may be used. In other cases, well-known methods, apparatuses, implementations, or operations are not shown or described in detail, in order not to obscure aspects of the present disclosure.

The accompanying drawings are merely exemplary illustrations of the present disclosure, the same reference numeral in the accompanying drawings represents the same or similar components, and therefore repeated descriptions of the components are omitted. Some block diagrams shown in the accompanying drawings do not necessarily correspond to physically or logically independent entities. Such functional entities may be implemented in a form of software, or implemented in one or more hardware modules or integrated circuits, or implemented in a combination of at least one of different networks, processor apparatuses, or microcontroller apparatuses.

Flowcharts shown in the accompanying drawings are merely examples of descriptions, and do not necessarily include all contents and operations, nor do they have to be executed in an order described. For example, some operations may be decomposed, and some operations may be combined or partially combined, so that an actual order of execution may change based on an actual situation.

In descriptions of this application, unless otherwise specified, "/" indicates "or", for example, "A/B" may indicate "A or B". For example, "and/or" in the present disclosure describes only an association relationship between associated objects and represents that three relationships may exist. For example, A and/or B may represent: Only A exists, both A and B exist, and only B exists. In addition, "at least one" means one or more, and "a plurality of" means two or more. Terms such as "first" and "second" do not limit a quantity or an execution sequence, and the terms such as "first" and "second" do not indicate a definite difference. Terms "comprising", "including" and "having" are used to express an open inclusion and mean that there may be additional elements/component/and the like in addition to listed elements/components/and the like.

To understand objectives, features, and advantages of this application more clearly, this application is further described in detail below with reference to the accompanying drawings and specific implementations. Embodiments and features in this application may be mutually combined without conflict.

To resolve a problem of low deduplication accuracy of a filter in a current blockchain, embodiments of this application provide a transaction processing method that can obtain a capacity-expanded filter from another node timely when a first block meets a capacity expansion condition, to improve deduplication accuracy of the filter while reducing occupation of resources (an internal memory resource or a disk resource) of an execution node.

FIG. 1A is a schematic architectural diagram of a transaction processing system according to an embodiment of this application. The transaction processing system includes a blockchain network 10 and a terminal device 20, where the blockchain network 10 is a network for data sharing between nodes, and the blockchain network may include a plurality of nodes 101. Each node 101 may receive input information during normal work, and maintain shared data (that is, a blockchain) in the blockchain network based on the received input information. To ensure information exchange in the blockchain network, there may be an information connection between each two nodes, and Peer To Peer (P2P) communication may be implemented between any two nodes, and to be specific, P2P communication may be performed through a wired communication link or a wireless communication link. For example, when any node in the blockchain network receives the input information, another node obtains the input information based on a consensus algorithm, and stores the input information as data in the shared data, so that data stored on all nodes in the blockchain network is consistent.

The terminal device 20 may access the blockchain network and communicate with nodes in the blockchain network, for example, submit transactions to be uploaded to the node, obtain data from the node, and the like. The terminal device 20 may be specifically a smartphone, a tablet computer, a notebook computer, a desktop computer, a vehicle-mounted intelligent terminal, or the like. This is not limited in embodiments of this application.

A quantity of nodes shown in FIG. 1A is merely used as an example, and any quantity of nodes may be deployed.

Each node in the blockchain network has a corresponding node identifier, and each node in the blockchain network may store node identifiers of other nodes in the blockchain network, to broadcast a generated block to the other nodes in the blockchain network based on the node identifiers of the other nodes subsequently. Each node may maintain a node identifier list shown in the following table, and correspondingly store a node name and a node identifier in the node identifier list. The node identifier may be an Internet Protocol (IP) address and any other type of information that can be used to identify the node, for example, an IP address.

TABLE 1

| Node name | Node identifier |
| --- | --- |
| Node 1 | XXXXXX |
| Node 2 | XXXXXX |
| . . . | . . . |
| Node N | XXXXXX |

Figure 1B:
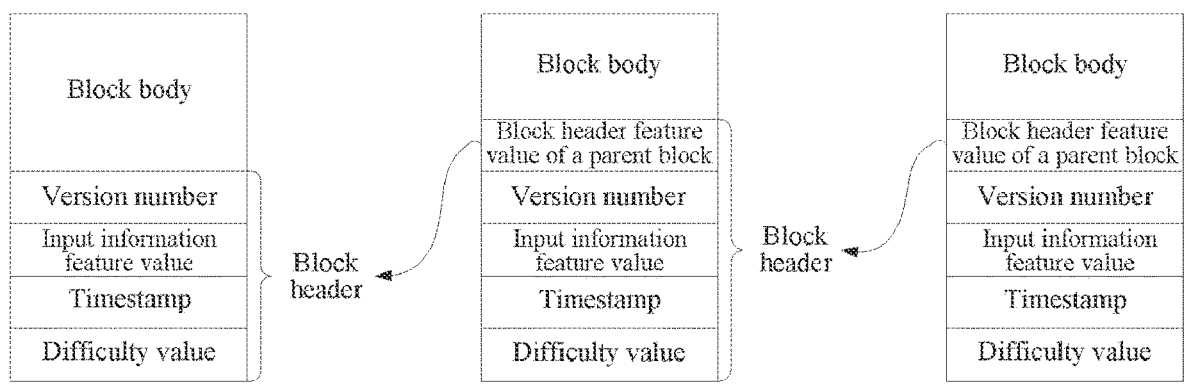
FIG. 1B is a schematic diagram of a structure of a blockchain according to an embodiment of this application.

Each node in the blockchain network stores the same blockchain. The blockchain includes a plurality of blocks based on an actual requirement. Refer to FIG. 1B. The blockchain includes a plurality of blocks. A genesis block includes a block header and a block body. The block header stores an input information feature value, a version number, a timestamp, and a difficulty value. The block body stores input information. A next block of the genesis block uses the genesis block as a parent block, and the next block also includes a block header and a block body. The block header stores an input information feature value of a current block, a block header feature value of the parent block, a version number, a timestamp, and a difficulty value, and the reset may be deduced by analogy. In this way, block data stored in each block in the blockchain is associated with block data stored in the parent block, thereby ensuring security of the input information in the block.

Figure 1C:
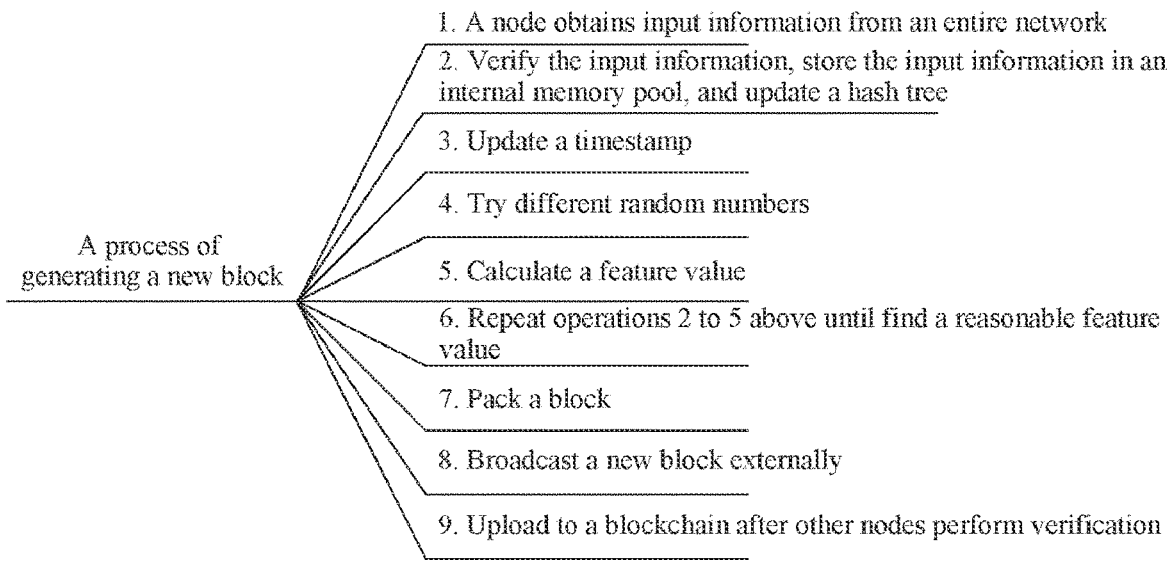
FIG. 1C is a schematic diagram of a process in which a new block is generated according to an embodiment of this application.

When each block in the blockchain is generated, referring to FIG. 1C, after a node where the blockchain is located receives the input information, the input information is verified. After verification is completed, the input information is stored in an internal memory pool, and a hash tree for recording the input information is updated. Then, an updated timestamp is updated to time when the input information is received, different random numbers are tried, and feature values are calculated for many times, so that the feature values calculated may meet the following formula:

$$SHA256(SHA256(\text{version} + \text{prev\_hash} + \text{merkle\_root} + ntime + nbits + x)) < \text{TARGET}$$

SHA256 represents a feature value algorithm for calculating the feature value; version (a version number) represents version information of a relevant block protocol in the blockchain; prev_hash represents the block header feature value of the parent block of the current block; merkle_root represents the feature value of the input information; ntime represents update time for updating the timestamp; nbits represents a current difficulty, which is fixed value within a period of time, and is determined again after a fixed period of time has passed; x represents a random number; and TARGET represents a feature value threshold, where the feature value threshold may be determined according to nbits.

In this way, when the random number that meets the foregoing formula is calculated, the information may be stored correspondingly, and the block header and the block body are generated, to obtain the current block. Then, the node where the blockchain is located sends, based on the node identifiers of other nodes in the blockchain network, a newly generated block to the other nodes in the blockchain network where the node is located, the newly generated block is verified by the other nodes, and after verification is completed, the newly generated block is added to the blockchain stored in the nodes.

A smart contract may be run on the nodes of the blockchain network. The smart contract is implemented by using code that is executed when a condition is met. A developer may define contract logic by a programming language and publish the contract logic to the blockchain (smart contract registration), call, based on logic of contract items, a key or another event to trigger execution, to complete the contract logic, and further provide functions of upgrading and canceling the smart contract.

In some feasible implementations, a node 101 of the blockchain network may obtain summary information of a target transaction when receiving the target transaction submitted by the terminal device 20, and use N Bloom filters to query the summary information of the target transaction from summary information corresponding to a processed transaction, where N is an integer greater than or equal to 1. If the summary information of the target transaction is queried, the target transaction is determined to be the processed transaction, and the target transaction is rejected to be added in a transaction pool. The Bloom filters may be used to efficiently and accurately check whether the submitted transaction has already appeared in a ledger, thereby effectively avoiding a repeated transaction.

Figure 2:
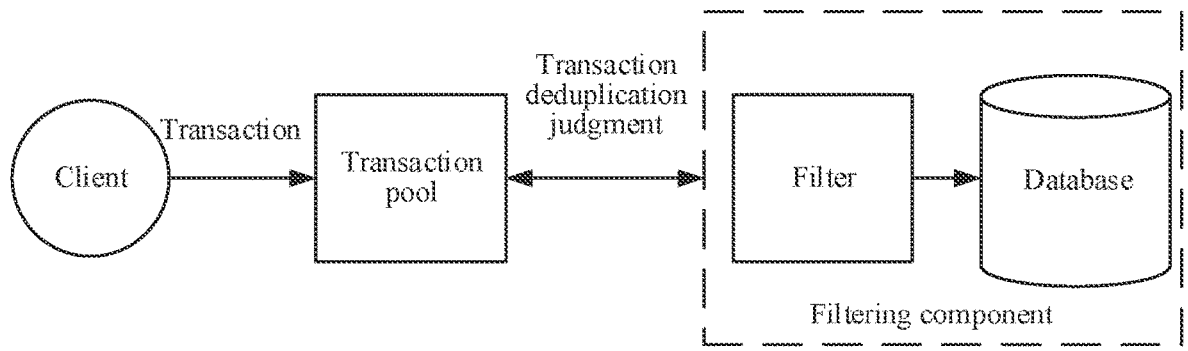
FIG. 2 is a schematic diagram of deduplication filtering on a blockchain according to the related art.

FIG. 2 is a schematic diagram of deduplication filtering on a blockchain according to the related art.

As shown in FIG. 2, a core of a deduplication filtering process of the blockchain in the related art is to first perform duplication judgment on transactions in the transaction pool through a filter (for example, a Bloom filter or a cuckoo filter), and if it is determined that the transaction exists, secondary judgment is performed through a database. A detailed processing procedure is shown in FIG. 3.

Figure 3:
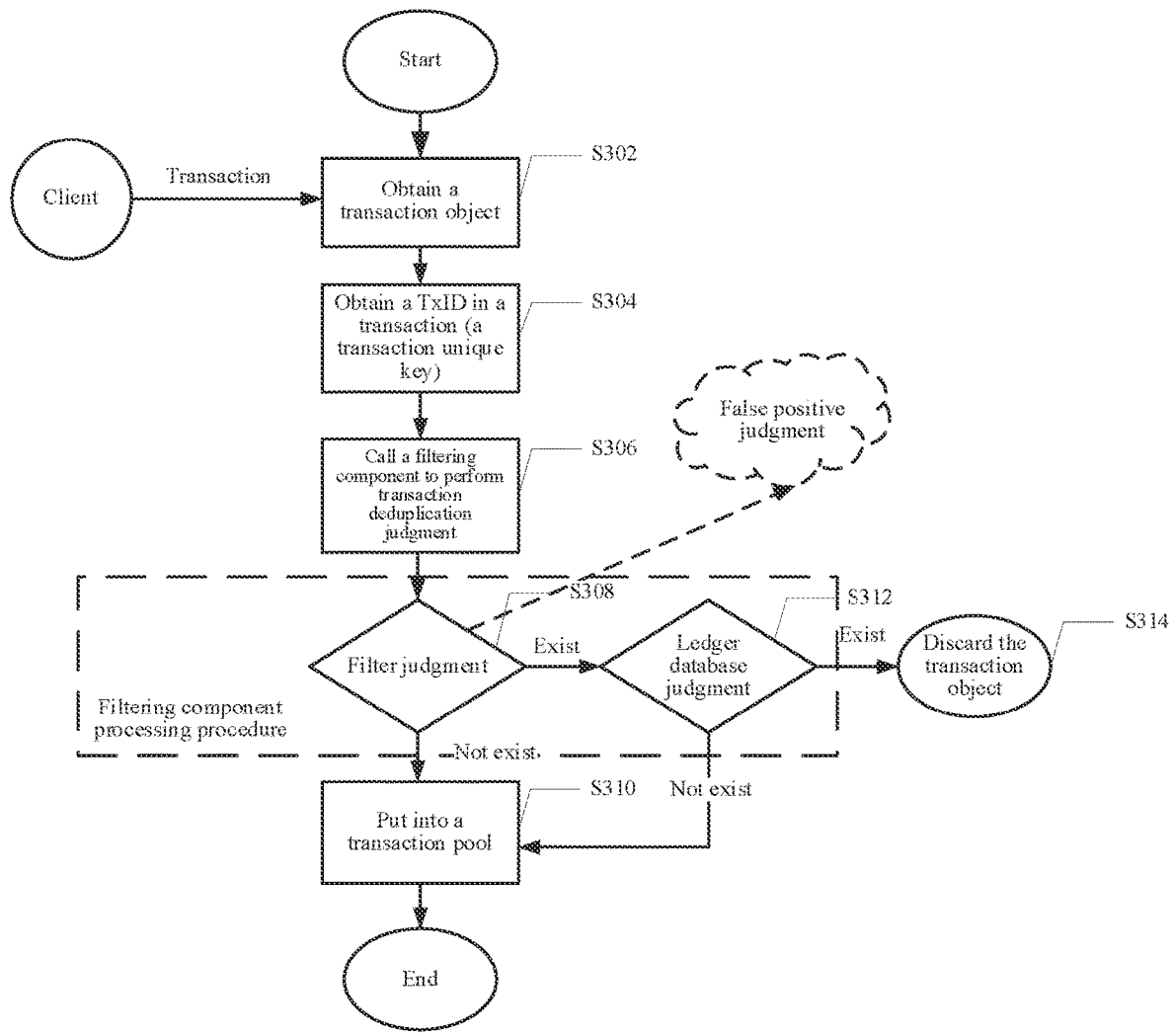
FIG. 3 is a flowchart of a deduplication filtering method according to the related art.

FIG. 3 is a flowchart of a deduplication filtering method according to the related art.

Refer to FIG. 3. The deduplication filtering method may include the following operations.

S302. Obtain a transaction object.

S304. Obtain a TxID in a transaction (a transaction unique key).

S306. Call a filtering component to perform transaction deduplication judgment.

S308. Perform deduplication judgment on the transaction object through a filter in the filtering component.

When the filter determines that the transaction object does not exist, S310 is performed, to put a transaction object into the transaction pool.

When the filter determines that the transaction object exists, S312 is performed, to perform deduplication judgment on the transaction object through a ledger database of the blockchain.

The ledger database may be ledger data on the blockchain.

When the ledger database determines that the transaction object does not exist, S310 is performed.

When the ledger database determines that the transaction object exists, S314 is performed, to discard the transaction object.

Currently, a commonly used method in the industry is to perform filtering through a filter in combination with a database, but the filter may perform false positive judgment on transaction duplication. In other words, if the filter determines that (negative) transaction duplication does not exist, there is definitely no transaction duplication. If the filter determines that (positive) transaction duplication exists, transaction duplication does not necessarily exist, to be specific, there may or may not be transaction duplication, and further judgment (database judgment) is required.

Therefore, the filter itself has a disadvantage. As a quantity of transactions increases, a misjudgment rate becomes higher. When the quantity of transactions reaches a scale, the misjudgment rate of the filter is very high. In this case, most of the transactions is judged to be positive. This loses meaning of the filter, which leads to judgment breakdown and direct access to the database, causing huge pressure on the database.

To resolve the technical problems, in a system architecture shown in FIG. 1A to FIG. 1C, an embodiment of the present disclosure provides a transaction processing method. The method may be executed by any node in any blockchain. As an execution entity, the node may be any electronic device having a computing processing capability. For ease of description, in this embodiment, the node is recorded as an execution node. The execution node and a first node and a second node mentioned below are all nodes in the same blockchain.

Figure 4:
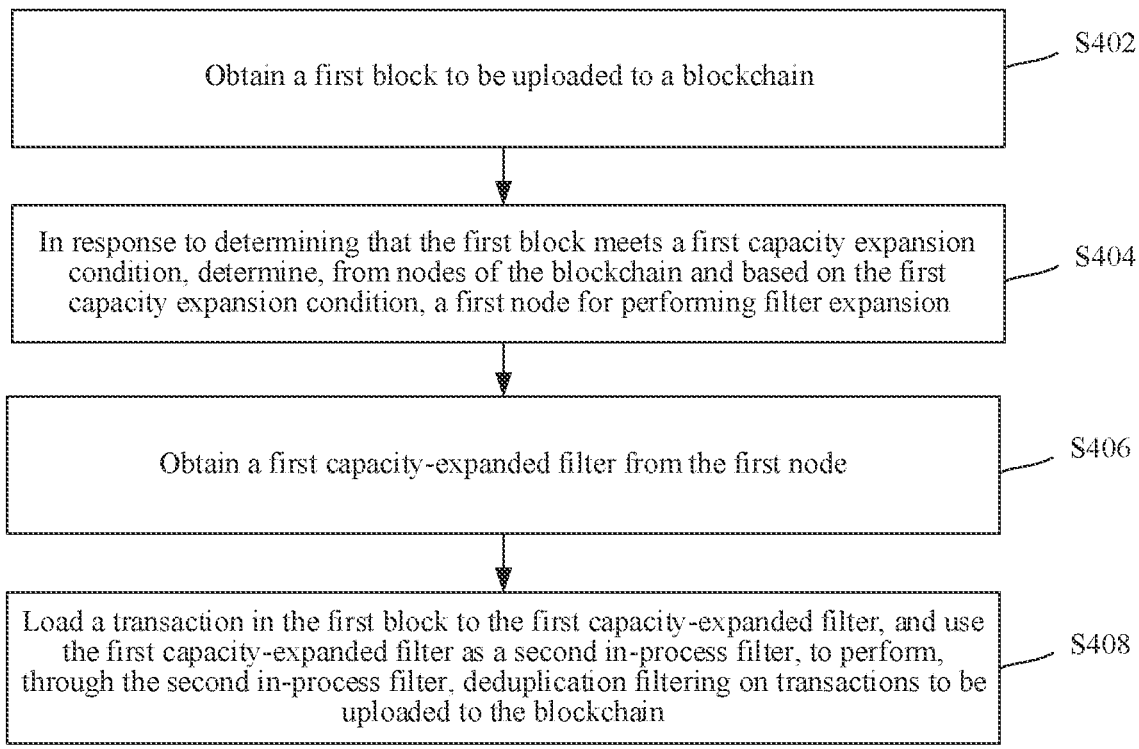
FIG. 4 is a flowchart of a transaction processing method according to an exemplary embodiment.

FIG. 4 is a flowchart of a transaction processing method according to an exemplary embodiment.

Refer to FIG. 4. The transaction processing method provided in this embodiment of the present disclosure may include the following operations.

S402. Obtain a first block to be uploaded to a blockchain.

The first block may be a block that is from a transaction pool of the execution node and that has not been uploaded.

S404. When it is determined that the first block meets a first capacity expansion condition, determine, from nodes of the blockchain and based on the first capacity expansion condition, a first node for performing filter expansion.

The first capacity expansion condition may include a quantity of blocks, a quantity of transactions, and the like that are set based on an actual requirement, for example, may be a quantity of blocks or a quantity of transactions that is set based on a capacity of the filter. This is not limited in the present disclosure. A larger capacity of the filter indicates a larger quantity of blocks configured in the first capacity expansion condition (that is, under the same error rate, a filter with a larger capacity may process a larger quantity of transactions (or blocks)).

The first capacity expansion condition may be specifically: when the quantity of blocks in the blockchain is greater than a threshold of a target quantity of blocks (or when the quantity of transactions is greater than a target quantity of transactions), expansion processing is performed based on a target capacity. A person skilled in the art may set the threshold of the target quantity of blocks, the target quantity of transactions, or the target capacity based on an actual requirement. This is not limited in the present disclosure.

S406. Obtain a first capacity-expanded filter from the first node.

A capacity of the first capacity-expanded filter is greater than a capacity of a first in-process filter in the execution node, and the first capacity-expanded filter is generated by the first node based on transactions having been uploaded to the blockchain.

The foregoing first capacity-expanded filter or the first in-process filter may be any filter that can perform deduplication filtering, for example, a Bloom filter or a cuckoo filter. This is not limited in the present disclosure.

The Bloom filter may be a data structure that judges whether certain data exists. This structure occupies small internal memory space, but may have a misjudgment rate. As a data amount in the Bloom filter becomes larger, the misjudgment rate becomes higher. If a judgment result of the Bloom filter is a false positive, to be specific, if it is judged that a value does not exist, the value definitely does not exist; and if it is judged that a value exists, the value may not exist.

In some embodiments, the foregoing first in-process filter may be run on an internal memory of the execution node. This is not limited in the present disclosure.

The first capacity-expanded filter may be generated through nodes having better performance (for example, nodes having more cores, a larger internal memory, or larger disk space) in the blockchain. The blockchain may determine, based on performance of each node, which nodes to construct the first capacity-expanded filter. In conclusion, nodes having better performance may construct more capacity-expanded filters, and nodes having poor performance may not necessarily construct capacity-expanded filters, thereby avoiding an impact of construction of the capacity-expanded filters on services of the nodes.

S408. Load a transaction in the first block to the first capacity-expanded filter, and use the first capacity-expanded filter as a second in-process filter, to perform, through the second in-process filter, deduplication filtering on transactions to be uploaded to the blockchain.

In some embodiments, hash calculation may be performed on the transaction in the first block by using a plurality of hash algorithms, and then calculation results are loaded to the first capacity-expanded filter.

In some embodiments, the first capacity-expanded filter may be a Bloom filter. A core of the Bloom filter is implemented by using a very large bit array and several hash functions. In some embodiments, it may be assumed that a length of the bit array is m, and a quantity of hash functions is k, where m is an integer greater than 1, and k is an integer greater than 1.

In some embodiments, how to load the transaction in the first block to the first capacity-expanded filter may be explained by using the following embodiments. First, a bit array corresponding to the first capacity-expanded filter is initialized, and each bit in the array is set to 0. For each transaction in the first block, transactions are mapped by using k hash functions in sequence. Each mapping generates a hash value. This value corresponds to a point on the bit array, and then a corresponding position of the bit array is marked as 1.

In some embodiments, the same method is used to query whether a W element exists in the capacity-expanded filter by mapping W to k points on the bit array through hashing. If one of the k points is not 1, it can be determined that the element definitely does not exist in the set. On the contrary, if the k points are all 1, the element may exist in the set.

In some embodiments, the execution node may replace an original first in-process filter with the first capacity-expanded filter, so that the execution node can perform, through the first capacity-expanded filter, deduplication filtering on the transactions to be uploaded to the blockchain.

In some embodiments, when the first capacity-expanded filter is not obtained from the first node, the transactions having been uploaded to the blockchain may be obtained; and then the first capacity-expanded filter is constructed based on the transactions having been uploaded to the blockchain, and the first capacity-expanded filter is used as the second in-process filter, to perform, through the second in-process filter, deduplication filtering on the transactions to be uploaded to the blockchain.

In the technical solution provided in this embodiment, when the first block meets the first capacity expansion condition (for example, an error rate of the first in-process filter reaches a threshold), one capacity-expanded filter is obtained from the first node of the blockchain and used as an in-process filter of the execution node, to perform deduplication filtering on transactions subsequently uploaded. By using the foregoing method, on one hand, the execution node may implement capacity expansion on the filter timely when the first block meets the capacity expansion condition, and continues to perform deduplication filtering based on the capacity-expanded filter. This can improve the deduplication accuracy of the execution node. On the other hand, the capacity-expanded filter is constructed through other nodes in the blockchain, which does not occupy resources of the execution node, and does not affect a service (for example, a deduplication filtering service) of the execution node. For those nodes having lower performance (for example, nodes having fewer cores), the deduplication accuracy is improved without affecting a service of the node itself.

Figure 5:
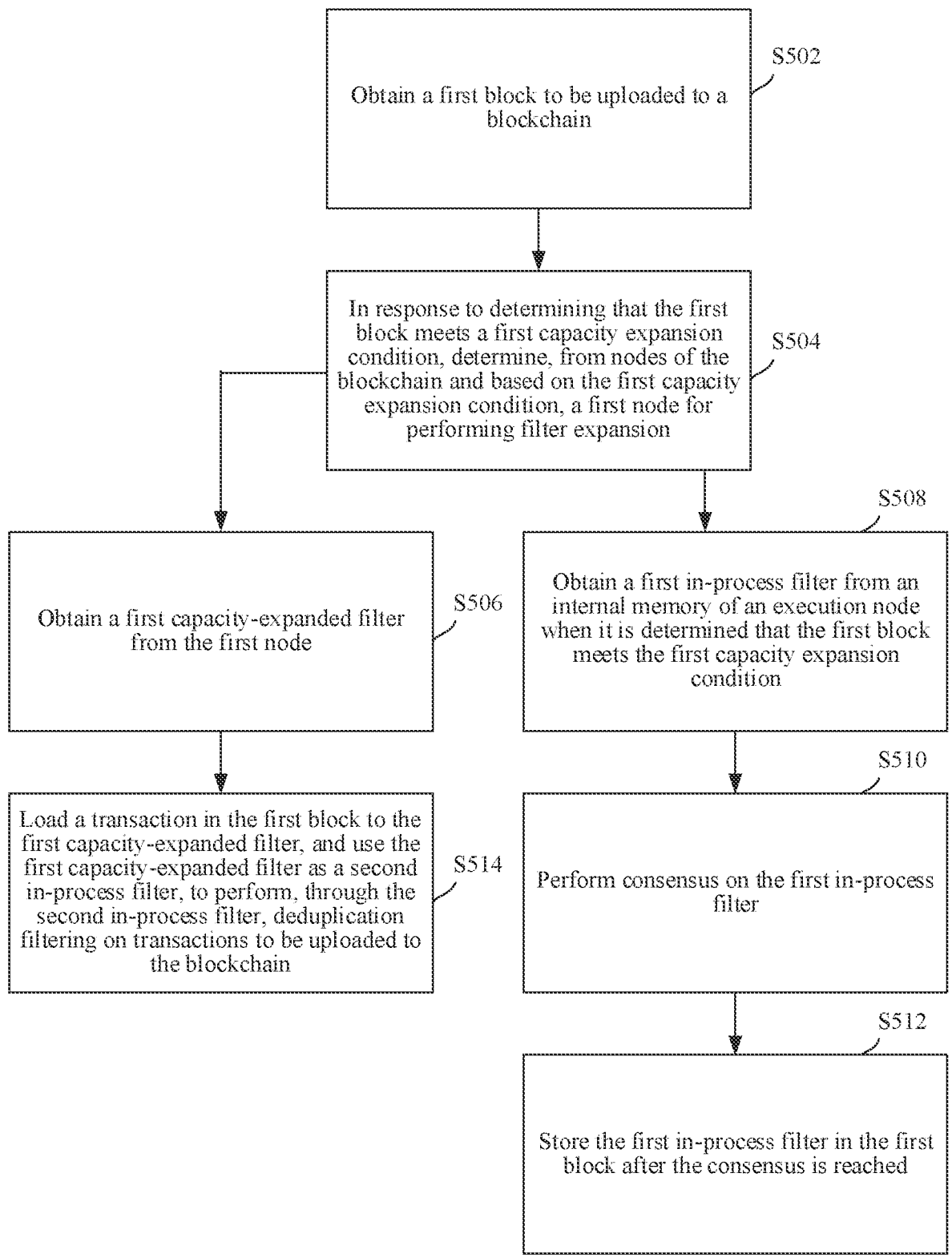
FIG. 5 is a flowchart of a transaction processing method according to an exemplary embodiment.

FIG. 5 is a flowchart of a transaction processing method according to an exemplary embodiment.

Refer to FIG. 5. The transaction processing method may include the following operations.

S502. Obtain a first block to be uploaded to a blockchain.

S504. When it is determined that the first block meets a first capacity expansion condition, determine, from nodes of the blockchain and based on the first capacity expansion condition, a first node for performing filter expansion.

S506. Obtain a first capacity-expanded filter from the first node.

A capacity of the first capacity-expanded filter is greater than a capacity of a first in-process filter in an execution node, and the first capacity-expanded filter is generated by the first node based on transactions having been uploaded to the blockchain.

S508. Obtain the first in-process filter from an internal memory of the execution node when it is determined that the first block meets the first capacity expansion condition.

Figure 6:
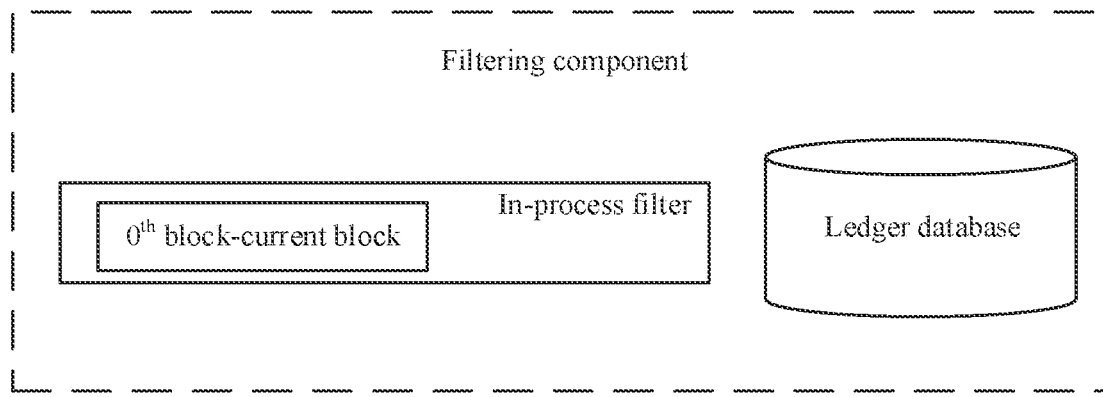
FIG. 6 is a schematic diagram of a filtering component according to an exemplary embodiment.

In some embodiments, the execution node may obtain the first in-process filter from a filtering component run in the internal memory. As shown in FIG. 6, the filtering component in the internal memory of the execution node may include an in-process filter (for example, the first in-process filter) and a ledger database. The in-process filter is generated based on transactions in the $0^{th}$ block to a current block having been uploaded, and the ledger database may be generated based on the transactions having been uploaded to the blockchain.

The in-process filter (for example, the first in-process filter) may be a Bloom filter that is currently performing deduplication filtering on the transaction, and the Bloom filter changes as the transaction is written to a ledger. The ledger database is a database of a ledger for storing local nodes.

In some embodiments, when the first block meets the first capacity expansion condition, it can be considered that the error rate of the first in-process filter reaches a threshold, and it is not suitable to continue to perform deduplication filtering.

S510. Perform consensus on the first in-process filter.

In some embodiments, if it is determined that the first block meets the first capacity expansion condition (or the error rate of the first in-process filter of the execution node reaches a threshold, it is further determined that the first in-process filter is not suitable to continue to load transactions), and consensus is performed on the first in-process filter in the blockchain.

S512. Store the first in-process filter in the first block after the consensus is reached.

In some embodiments, the first in-process filter may be uploaded and stored by using the following method. The execution node initiates, in the blockchain, a transaction to upload the first in-process filter; a plurality of consensus nodes (the consensus nodes are nodes in the blockchain) in the blockchain perform consensus processing on the first in-process filter (for example, determine whether the first in-process filter uploaded by the execution node is consistent with the first in-process filter generated by the execution node, if the first in-process filters are consistent, the consensus is reached); when a quantity of consensus nodes that reach the consensus exceeds a target threshold, the first in-process filter is considered to reach the consensus; when the first in-process filter reaches the consensus in the blockchain, the first in-process filter is stored in a block body of the first block in the transaction pool; and finally, the first block in the transaction pool is uploaded and flushed in the blockchain.

In some embodiments, consensus uploading may be performed on the first in-process filter, the second in-process filter, and the like on an appropriate occasion to facilitate traceability, increase costs of a malicious behavior of a node or a client, and reduce malicious behaviors of the node or the client.

In the foregoing embodiments, when the first block meets the first capacity expansion condition, the first in-process filter may undergo consensus uploading and be stored in the first block, to facilitate subsequent traceability and increase the costs of the malicious behavior of the node (malicious refusal to upload or malicious upload), and improve authenticity and reliability of upload data of the blockchain.

Figure 7:
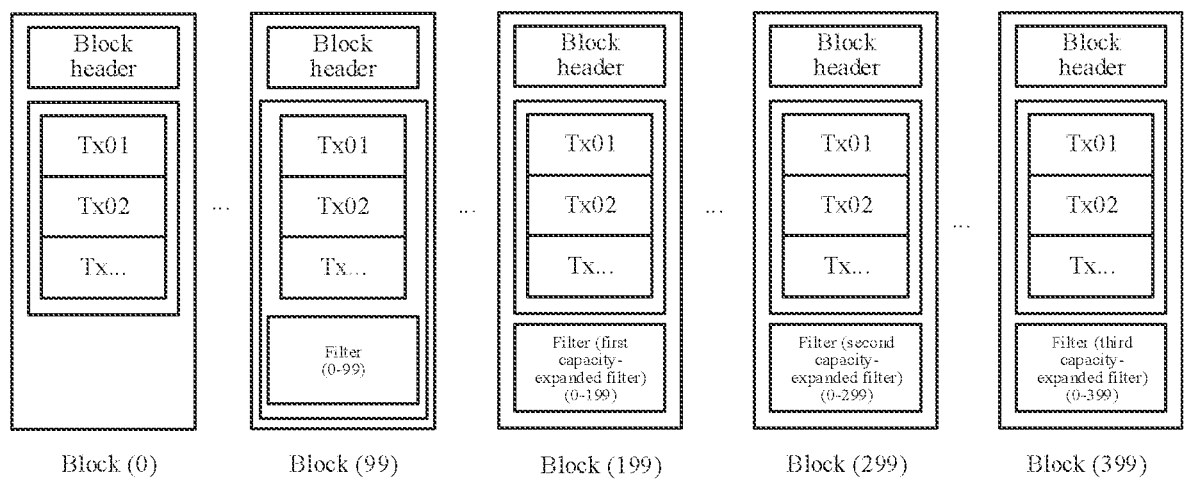
FIG. 7 is a schematic diagram of a blockchain according to an exemplary embodiment.

FIG. 7 is a schematic diagram of a blockchain according to an exemplary embodiment.

As shown in FIG. 7, some blocks in the blockchain (for example, the 99$^{th}$ block, the 199$^{th}$ block, the 299$^{th}$ block, and the like) may store filters to trace a malicious behavior when the malicious behavior is found in a node or a client.

S514. Load a transaction in the first block to the first capacity-expanded filter, and use the first capacity-expanded filter as a second in-process filter, to perform, through the second in-process filter, deduplication filtering on transactions to be uploaded to the blockchain.

In the technical solution provided in this embodiment, on one hand, a process of loading the filter may be accelerated at startup by storing the first in-process filter in the block; and on the other hand, the malicious behavior may be traced to increase the costs of the malicious behavior of the node, thereby avoiding the malicious behavior of the node.

Figure 8:
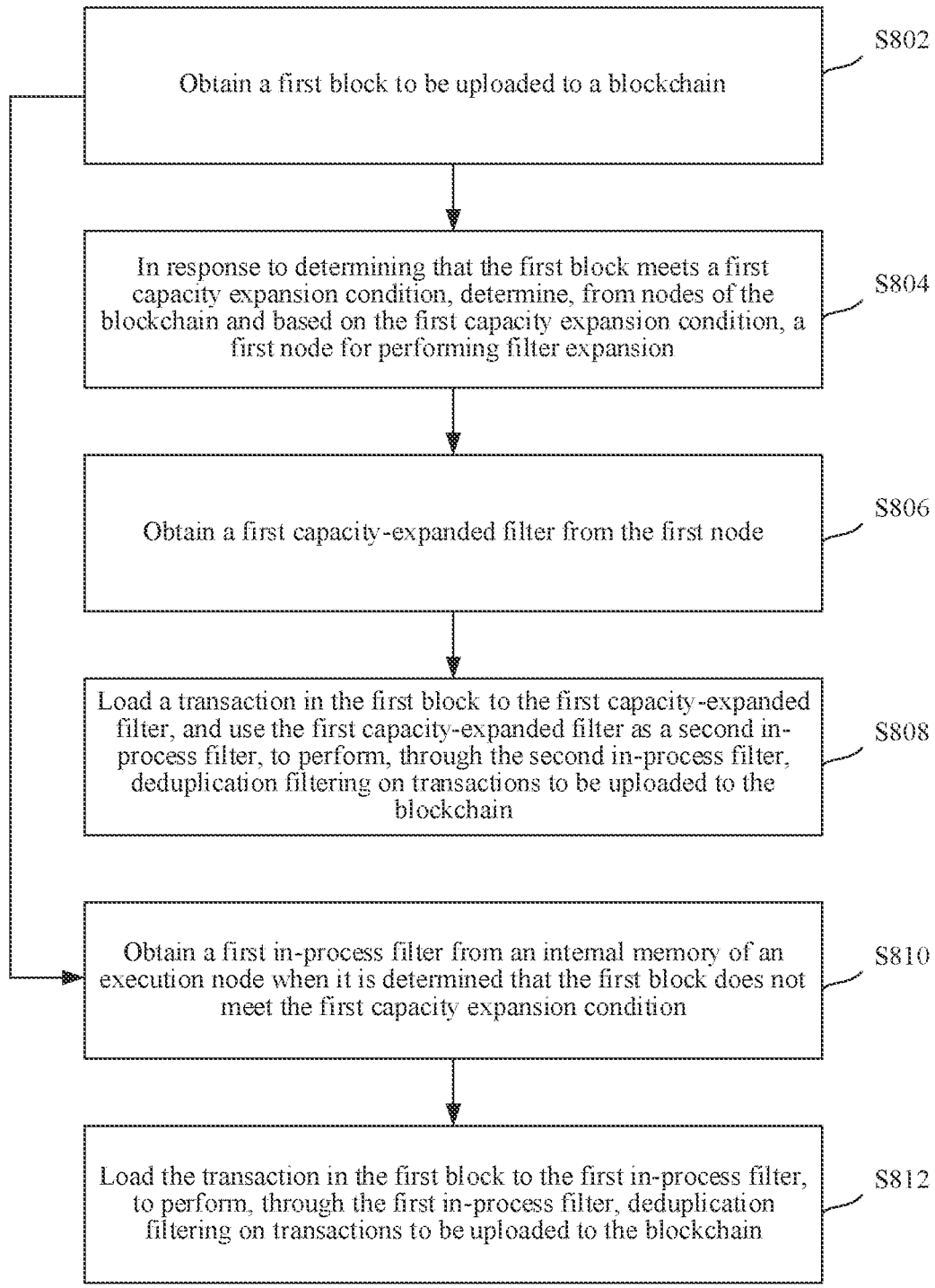
FIG. 8 is a flowchart of a transaction processing method according to an exemplary embodiment.

FIG. 8 is a flowchart of a transaction processing method according to an exemplary embodiment.

Refer to FIG. 8. The transaction processing method may include the following operations.

S802. Obtain a first block to be uploaded to a blockchain.

S804. When it is determined that the first block meets a first capacity expansion condition, determine, from nodes of the blockchain and based on the first capacity expansion condition, a first node for performing filter expansion.

S806. Obtain a first capacity-expanded filter from the first node.

A capacity of the first capacity-expanded filter is greater than a capacity of a first in-process filter in an execution node, and the first capacity-expanded filter is generated by the first node based on transactions having been uploaded to the blockchain.

S808. Load a transaction in the first block to the first capacity-expanded filter, and use the first capacity-expanded filter as a second in-process filter, to perform, through the second in-process filter, deduplication filtering on transactions to be uploaded to the blockchain.

S810. Obtain the first in-process filter from an internal memory of the execution node when it is determined that the first block does not meet the first capacity expansion condition.

S812. Load the transaction in the first block to the first in-process filter, to perform, through the first in-process filter, deduplication filtering on the transactions to be uploaded to the blockchain.

In the technical solution provided in this embodiment, the first block is continued to be loaded to the in-process filter in the execution node when the first block does not meet the first capacity expansion condition (that is, the error rate of the first in-process filter does not reach a threshold). Based on the foregoing method, deduplication filtering may be directly performed when the locally stored first in-process filter meets a deduplication filtering condition, and there is no need to obtain new filters from other nodes, thereby reducing a quantity of data interactions in the blockchain and improving upload efficiency of the blockchain.

In some embodiments, the first node may be included in the plurality of nodes of the blockchain. The first node may be a node in the blockchain having good device performance (for example, with a large quantity of cores, a large internal memory, a large disk, or a strong computing capability).

In some embodiments, there may be one or more first nodes. In some embodiments, the first node may include a first execution node and a second execution node.

The following describes how to obtain the first capacity-expanded filter from the first node by using the first execution node and the second execution node as an example. The first node may further include a third execution node, a fourth execution node . . . , and the like. A person skilled in the art may easily extend the technical solutions provided in the following embodiments to a case in which the first node may further include a third execution node, a fourth execution node . . . .

Figure 9:
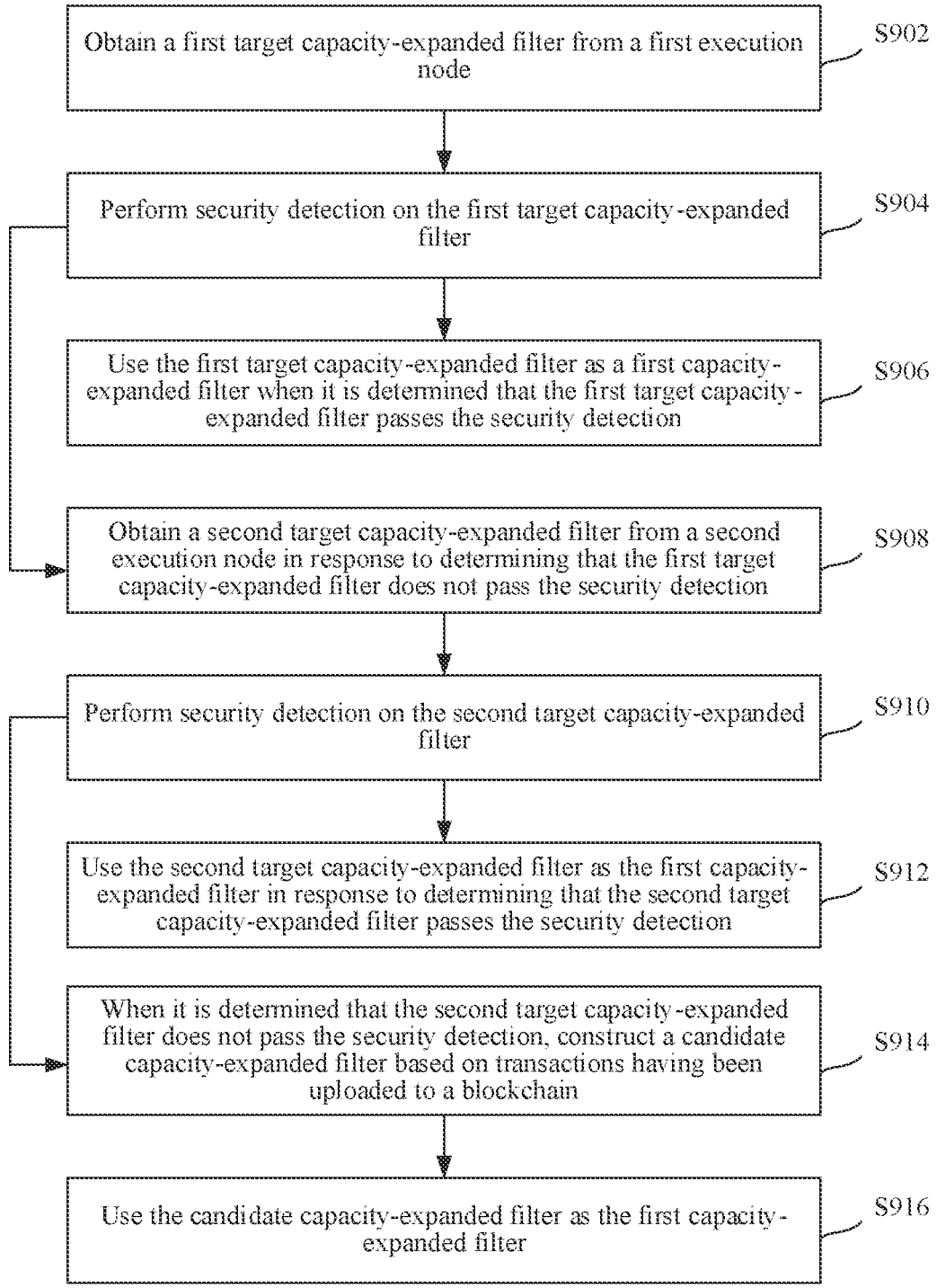
FIG. 9 is a flowchart of a method for determining a first capacity-expanded filter according to an exemplary embodiment.

FIG. 9 is a flowchart of a method for determining a first capacity-expanded filter according to an exemplary embodiment.

Refer to FIG. 9. The foregoing method for determining a first capacity-expanded filter may include the following operations.

S902. Obtain a first target capacity-expanded filter from the first execution node.

S904. Perform security detection on the first target capacity-expanded filter.

To determine whether the first target capacity-expanded filter constructed by the first execution node is correct, the security detection may be performed on the first target capacity-expanded filter provided by the first execution node.

In some embodiments, the security detection may be performed on the first target capacity-expanded filter by using the following method: constructing a candidate capacity-expanded filter based on the transactions having been uploaded to the blockchain, where a capacity of the candidate capacity-expanded filter is equal to a capacity of the first target capacity-expanded filter; and performing the security detection on the first target capacity-expanded filter based on the candidate capacity-expanded filter.

In some embodiments, the security detection may be performed on the first target capacity-expanded filter by using the following method: obtaining at least one uploaded transaction from the blockchain; randomly constructing at least one virtual transaction; and performing the security detection on the first target capacity-expanded filter based on the at least one uploaded transaction and the at least one virtual transaction.

S906. Use the first target capacity-expanded filter as the first capacity-expanded filter when it is determined that the first target capacity-expanded filter passes the security detection.

In some embodiments, the first capacity-expanded filter may be directly used as the first capacity-expanded filter when it is determined that the first capacity-expanded filter passes the security detection.

S908. Obtain a second target capacity-expanded filter from the second execution node when it is determined that the first target capacity-expanded filter does not pass the security detection.

S910. Perform the security detection on the second target capacity-expanded filter.

S912. Use the second target capacity-expanded filter as the first capacity-expanded filter when it is determined that the second target capacity-expanded filter passes the security detection.

Certainly, if the first node further has a third execution node and a fourth execution node, the capacity-expanded filter may be continued to be obtained from the third execution node or the fourth execution node, to obtain the first capacity-expanded filter.

S914. Construct a candidate capacity-expanded filter based on the transactions having been uploaded to the blockchain when it is determined that the second target capacity-expanded filter does not pass the security detection, where the capacity of the candidate capacity-expanded filter is equal to the capacity of the first target capacity-expanded filter.

S916. Use the candidate capacity-expanded filter as the first capacity-expanded filter.

In the foregoing embodiment, on one hand, it can be determined through the security detection that the obtained first capacity-expanded filter is not maliciously tampered with and is real and effective, thereby improving accuracy of deduplication filtering. On the other hand, the first capacity-expanded filter may be obtained from a plurality of first nodes. This not only improves authenticity of the first capacity-expanded filter, but also avoids problems such as low efficiency of deduplication filtering caused by construction of the first capacity-expanded filter by the execution node itself.

In some other embodiments, the first node may include a plurality of execution nodes, and the first capacity-expanded filter may undergo consensus among the plurality of execution nodes, and then is sent to the execution node after the consensus is reached (if the consensus is not reached, the first capacity-expanded filter is not sent to the execution node). After receiving the first capacity-expanded filter that reaches the consensus of the plurality of execution nodes, the execution node performs the security detection on the received first capacity-expanded filter. After the security detection is reached, the first capacity-expanded filter is used as an in-process filter to perform deduplication filtering on the transactions to be uploaded. This solution can ensure that all uploaded transactions are recorded in the first capacity-expanded filter, thereby preventing the malicious behavior of the first node, and further improving effectiveness of deduplication filtering of upload data in the blockchain.

Figure 10:
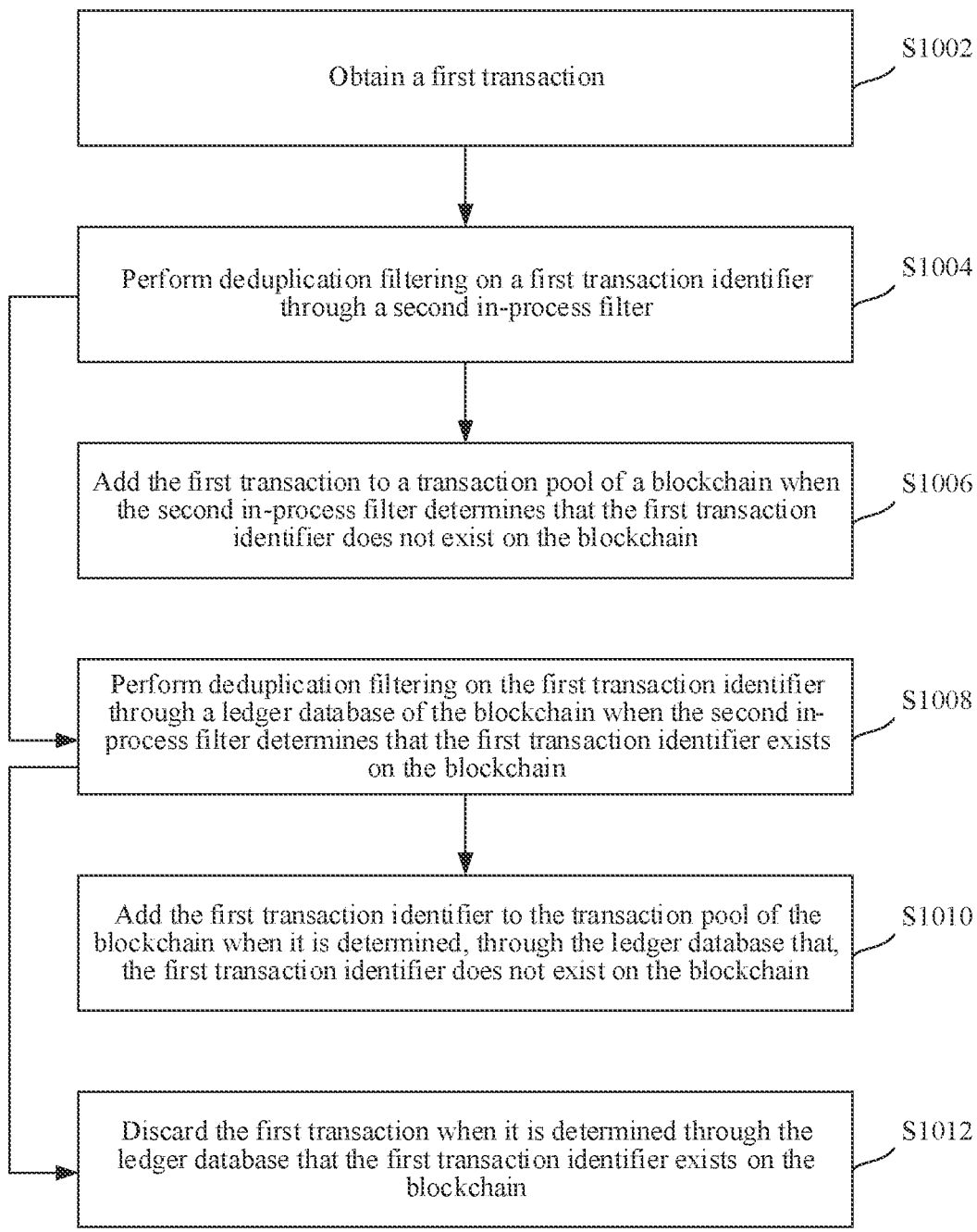
FIG. 10 is a flowchart of a method for determining deduplication filtering according to an exemplary embodiment.

FIG. 10 is a flowchart of a method for determining deduplication filtering according to an exemplary embodiment.

Refer to FIG. 10. The foregoing deduplication filtering method may include the following operations.

S1002. Obtain a first transaction.

The first transaction includes a first transaction identifier.

The foregoing first transaction identifier may be Tx01, Tx02, Tx03 . . . , or the like in the block in FIG. 7. This is not limited in the present disclosure.

S1004. Perform deduplication filtering on the first transaction identifier through the second in-process filter.

In some embodiments, before deduplication filtering is performed on the first transaction identifier through the second in-process filter, deduplication filtering also needs to be performed on the first transaction identifier through the transaction pool in the execution node. If the transaction pool of the execution node determines that the first transaction identifier exists, the first transaction is discarded; and if the transaction pool of the execution node determines that the first transaction does not exist, deduplication filtering continues to be performed on the first transaction identifier through the second in-process filter.

S1006. Add the first transaction to the transaction pool of the blockchain when the second in-process filter determines that the first transaction identifier does not exist on the blockchain.

S1008. Perform deduplication judgment on the first transaction identifier through the ledger database of the blockchain when the second in-process filter determines that the first transaction identifier exists on the blockchain.

S1010. Add the first transaction identifier to the transaction pool of the blockchain when it is determined, through the ledger database that, the first transaction identifier does not exist on the blockchain.

S1012. Discard the first transaction when it is determined, through the ledger database, that the first transaction identifier exists on the blockchain.

In the technical solution provided in this embodiment, when the second in-process filter determines that the first transaction identifier exists, secondary deduplication is further performed on the first transaction identifier through the ledger database, thereby improving accuracy of deduplication filtering in the execution node.

Figure 11:
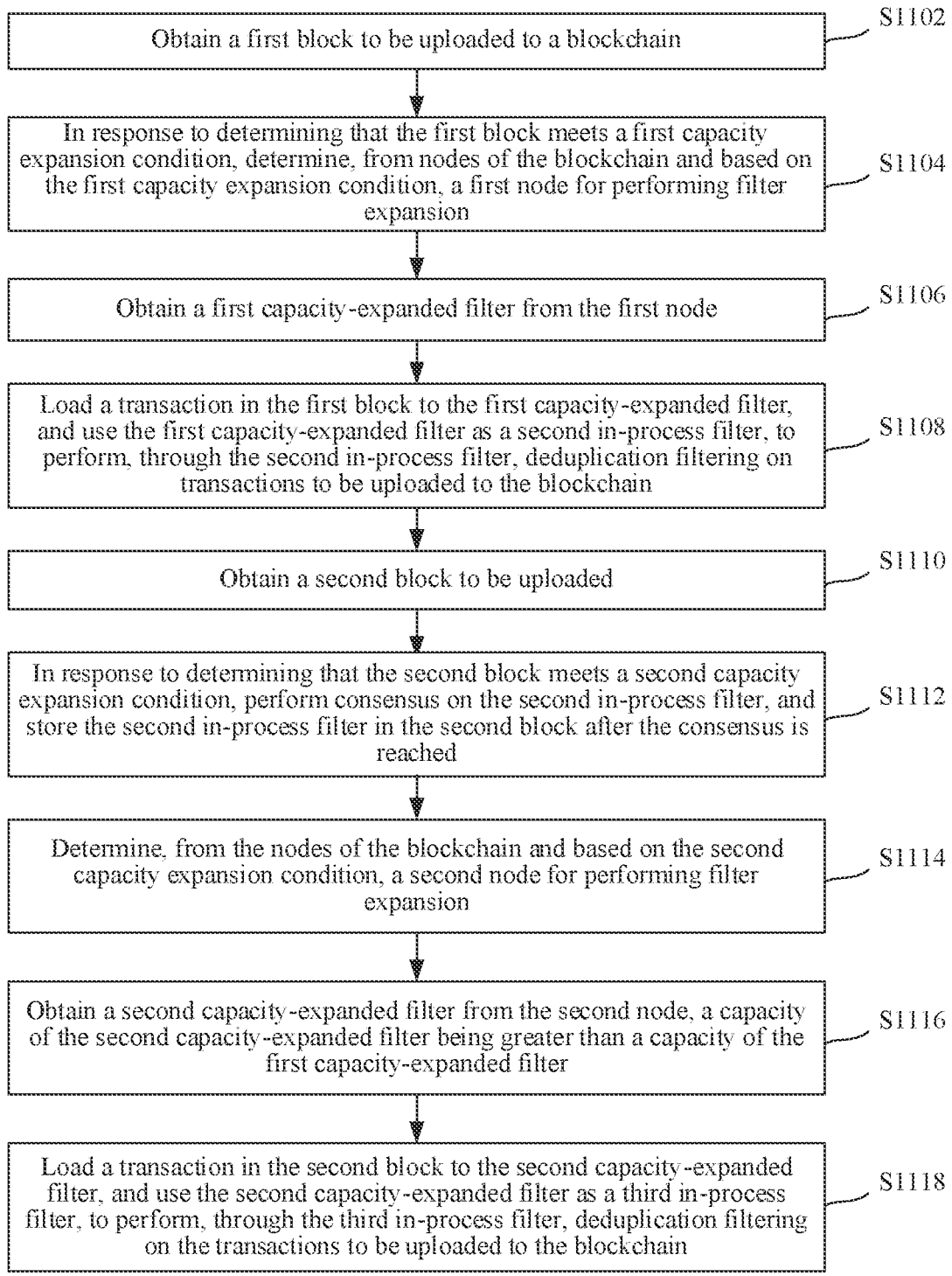
FIG. 11 is a flowchart of a transaction processing method according to an exemplary embodiment.

FIG. 11 is a flowchart of a transaction processing method according to an exemplary embodiment.

Refer to FIG. 11. The transaction processing method may include the following operations.

S1102. Obtain a first block to be uploaded to a blockchain.

S1104. When it is determined that the first block meets a first capacity expansion condition, determine, from nodes of the blockchain and based on the first capacity expansion condition, a first node for performing filter expansion.

S1106. Obtain a first capacity-expanded filter from the first node.

A capacity of the first capacity-expanded filter is greater than a capacity of a first in-process filter in an execution node, and the first capacity-expanded filter is generated by the first node based on transactions having been uploaded to the blockchain.

S1108. Load a transaction in the first block to the first capacity-expanded filter, and use the first capacity-expanded filter as a second in-process filter, to perform, through the second in-process filter, deduplication filtering on transactions to be uploaded to the blockchain.

S1110. Obtain a second block to be uploaded.

S1112. When it is determined that the second block meets a second capacity expansion condition, perform consensus on the second in-process filter, and store the second in-process filter in the second block after the consensus is reached, where the first capacity expansion condition is different from the second capacity expansion condition.

S1114. Determine, from the nodes of the blockchain and based on the second capacity expansion condition, a second node for performing filter expansion.

The second capacity expansion condition may be a quantity of blocks, a quantity of transactions, or the like that is set based on an actual requirement, for example, may be a quantity of blocks or a quantity of transactions that is set based on a capacity of the filter. This is not limited in the present disclosure. A larger capacity of the filter indicates a larger quantity of blocks configured in the second capacity expansion condition (that is, under the same error rate, a filter with a larger capacity may process a larger quantity of transactions (or blocks)).

The first capacity expansion condition and the second capacity expansion condition may be different. The quantity of blocks and the quantity of transactions set in the second capacity expansion condition are greater than the quantity of blocks and the quantity of transactions set in the first capacity expansion condition. In addition, a capacity of a filter corresponding to the second capacity expansion condition is also greater than a capacity of a filter corresponding to the first capacity expansion condition.

S1116. Obtain a second capacity-expanded filter from the second node, where a capacity of the second capacity-expanded filter is greater than the capacity of the first capacity-expanded filter.

The second capacity-expanded filter is generated by the second node based on the transactions having been uploaded to the blockchain. The transactions having been uploaded to the blockchain include the transaction in the first block.

S1118. Load a transaction in the second block to the second capacity-expanded filter, and use the second capacity-expanded filter as a third in-process filter, to perform, through the third in-process filter, deduplication filtering on the transactions to be uploaded to the blockchain.

The technical solution provided in this embodiment can promptly perform capacity expansion on the second in-process filter when an error rate of the second in-process filter is greater than a threshold (or a quantity of blocks or transactions in the blockchain is greater than a threshold), to improve accuracy of the filter.

In some embodiments, the first node that constructs the first capacity-expanded filter based on the first capacity expansion condition may be the execution node in the present disclosure. In other words, the first node may further construct and use the first in-process filter while constructing the first capacity-expanded filter.

Figure 12:
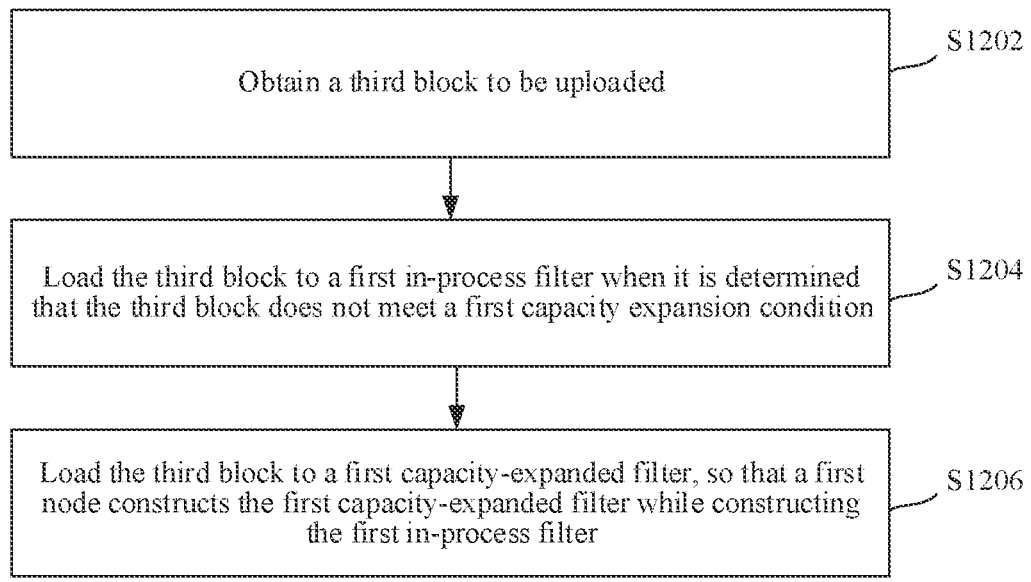
FIG. 12 is a flowchart of a method for constructing a capacity-expanded filter according to an exemplary embodiment.

FIG. 12 is a flowchart of a method for constructing a capacity-expanded filter according to an exemplary embodiment.

Refer to FIG. 12. The foregoing method for constructing a capacity-expanded filter may include the following operations.

S1202. Obtain a third block to be uploaded.

The first node may be a node having better performance and more computing resources in the blockchain.

Correspondingly, the node having better performance and more computing resources in the blockchain may be enabled to construct the first capacity-expanded filter in a background, thereby avoiding an impact on a service of the first node, and avoiding an impact on services of other nodes due to construction of the first capacity-expanded filter.

S1204. Load the third block to the first in-process filter when it is determined that the third block does not meet the first capacity expansion condition.

S1206. Load the third block to the first capacity-expanded filter, so that the first node constructs the first capacity-expanded filter while constructing the first in-process filter.

Figure 13:
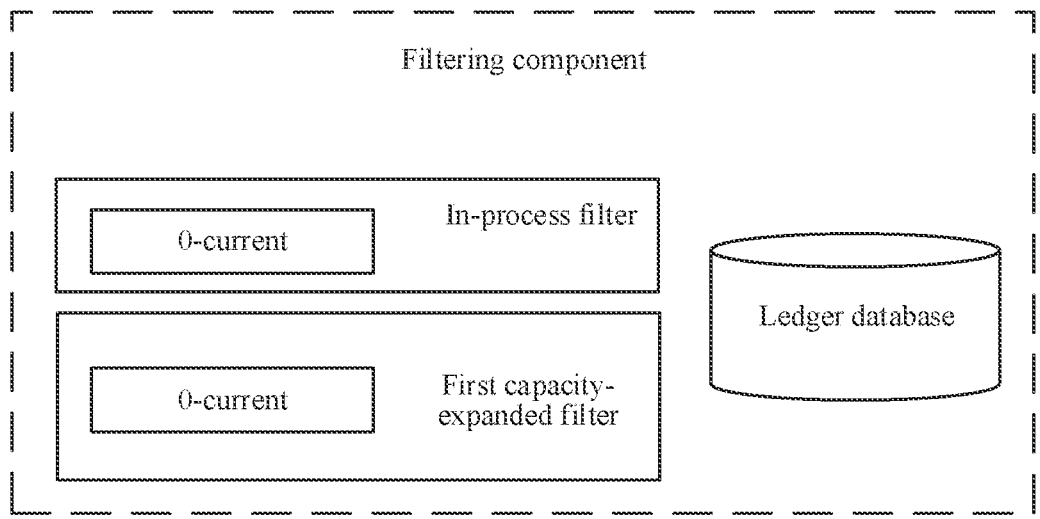
FIG. 13 is a schematic diagram of a filtering component according to an exemplary embodiment.

As shown in FIG. 13, the first node not only constructs the first in-process filter, but also constructs the first capacity-expanded filter in the background (that is, in an internal memory). The construction of the first capacity-expanded filter is completed without affecting the services in the nodes in the blockchain (which may be execution efficiency and execution accuracy of the service).

In some embodiments, the second node that constructs the second capacity-expanded filter based on the second capacity expansion condition may be the execution node in the present disclosure. In other words, the second node may further construct and use the second in-process filter while constructing the second capacity-expanded filter while.

Figure 14:
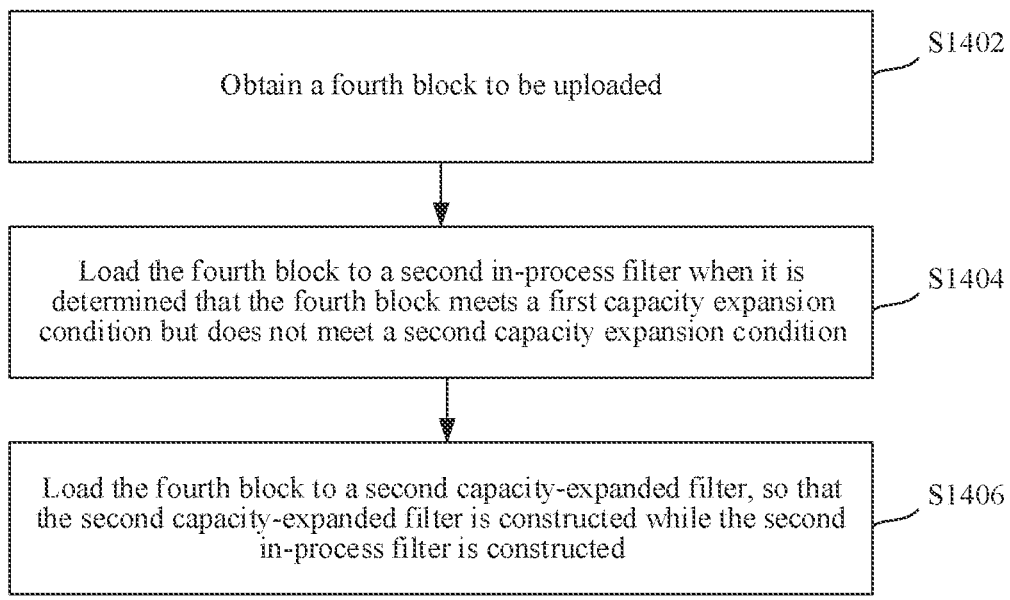
FIG. 14 is a flowchart of a method for constructing a capacity-expanded filter according to an exemplary embodiment.

FIG. 14 is a flowchart of a method for constructing a capacity-expanded filter according to an exemplary embodiment.

Refer to FIG. 14. The foregoing method for constructing a capacity-expanded filter may include the following operations.

S1402. Obtain a fourth block to be uploaded.

S1404. Load the fourth block to the second in-process filter when it is determined that the fourth block meets the first capacity expansion condition but does not meet the second capacity expansion condition.

S1406. Load the fourth block to the second capacity-expanded filter, so that the second capacity-expanded filter is also constructed while the second in-process filter is constructed.

Figure 15:
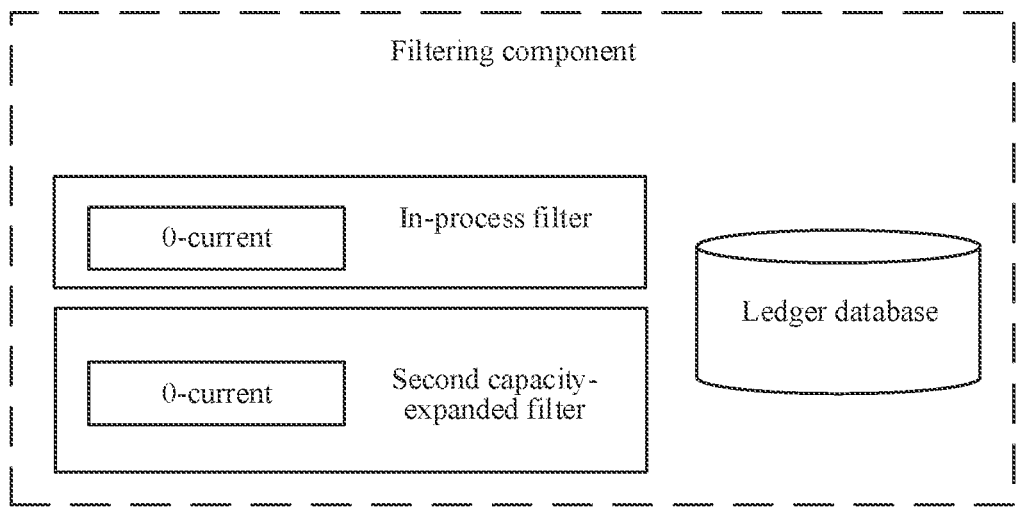
FIG. 15 is a schematic diagram of a filtering component according to an exemplary embodiment.

As shown in FIG. 15, the second node not only constructs the first in-process filter, but also constructs the second capacity-expanded filter in the background (that is, in the internal memory). The construction of the second capacity-expanded filter is completed without affecting the service in the nodes in the blockchain (which may be execution efficiency and execution accuracy of the service).

Figure 16:
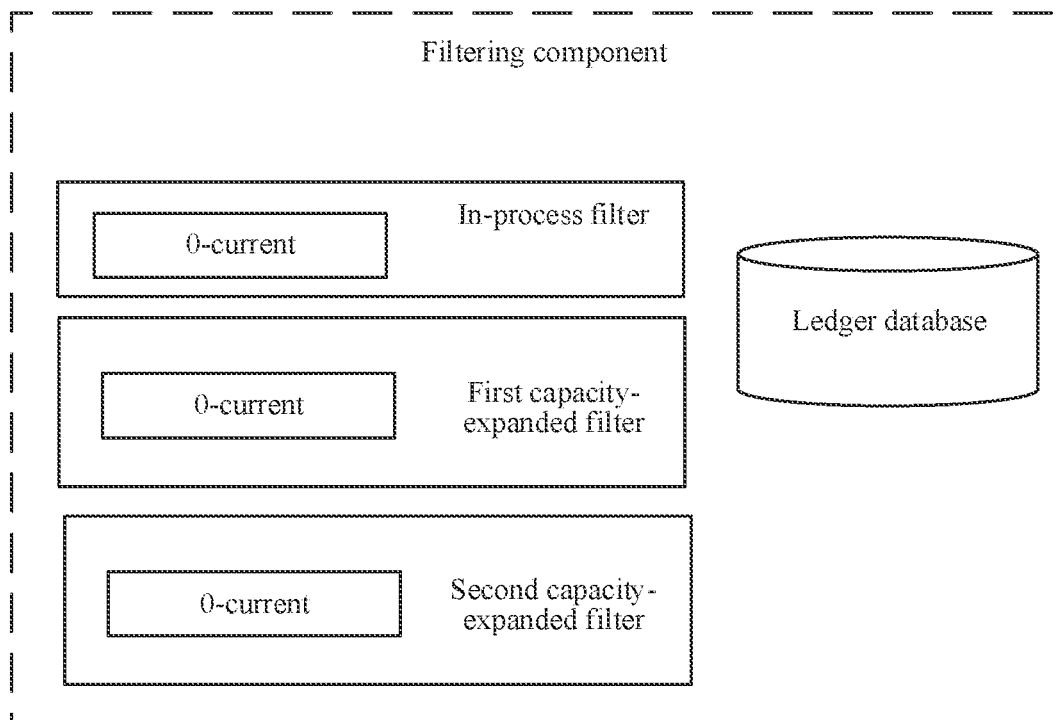
FIG. 16 is a schematic diagram of a filtering component according to an exemplary embodiment.

In some other embodiments, because some nodes have a lot of computing resources, the nodes not only construct the first in-process filter, but also construct the first capacity-expanded filter and the second capacity-expanded filter (as shown in FIG. 16) in the background (that is, in the internal memory). Therefore, the first node and the second node may be the same node. This is not limited in the present disclosure.

Figure 17:
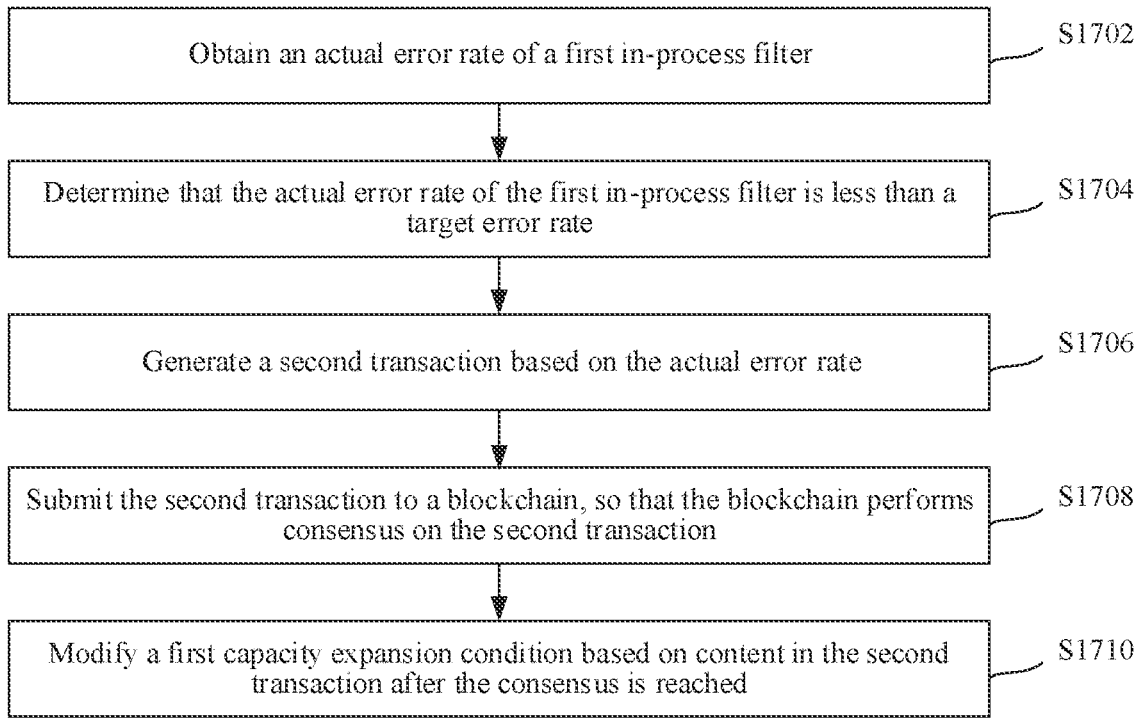
FIG. 17 is a flowchart of a method for modifying a capacity expansion condition according to an exemplary embodiment.

FIG. 17 is a flowchart of a method for modifying a capacity expansion condition according to an exemplary embodiment.

Refer to FIG. 17. The foregoing method for modifying a capacity expansion condition may include the following operations.

S1702. Obtain an actual error rate of the first in-process filter.

In some embodiments, the actual error rate of the first in-process filter may be determined based on blocks or transactions having been uploaded to the blockchain. The present disclosure does not limit the method for determining the actual error rate, which may be determined by a person skilled in the art based on an actual requirement.

S1704. Determine that the actual error rate of the first in-process filter is less than a target error rate.

In some embodiments, a person skilled in the art may preset a target error rate, where the target error rate corresponds to the first capacity expansion condition.

In some embodiments, the first capacity expansion condition may be modified when it is determined that the actual error rate of the first in-process filter when uploading is performed on an $N^{th}$ block is less than the target error rate or greater than the target error rate, where N is a positive integer greater than 1.

For example, when the first capacity expansion condition is set, it is considered that the target error rate of the first in-process filter when uploading is performed on an $M^{th}$ block reaches a threshold, and capacity expansion needs to be performed on the first in-process filter on a Kth block. In an actual operation, it is found that when uploading is performed on the $M^{th}$ block, the target error rate of the first in-process filter is much less than the target error rate, it may be considered that the first in-process filter can continue to be used, and capacity expansion is not urgently performed, and the first capacity expansion condition needs to be modified. Alternatively, in an actual operation, it is found that when uploading is performed on the $M^{th}$ block, the target error rate of the first in-process filter is greater than the target error rate, it may be considered that the first in-process filter may not continue to be used and needs to be expanded timely, and the first capacity expansion condition also needs to be modified.

S1706. Generate a second transaction based on the actual error rate.

S1708. Submit the second transaction to the blockchain, so that the blockchain performs consensus on the second transaction.

S1710. Modify the first capacity expansion condition based on content in the second transaction after the consensus is reached.

In the technical solution provided in this embodiment, the first capacity expansion condition may be modified through transaction uploading, thereby facilitating modification of the first capacity expansion condition based on the actual error rate of the first in-process filter, which is flexible and effective.

Figure 18:
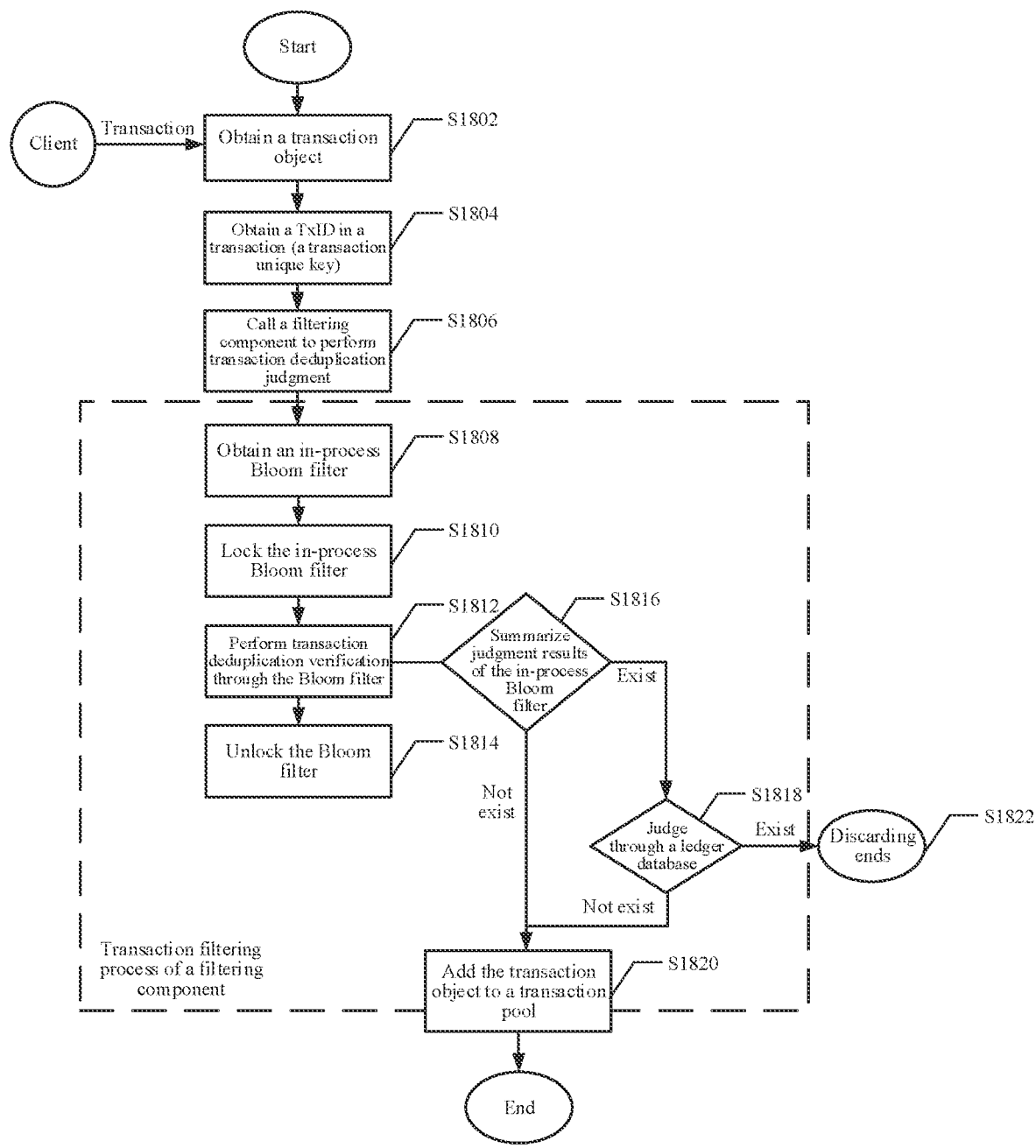
FIG. 18 is a schematic diagram of a deduplication filtering method according to an exemplary embodiment.

FIG. 18 is a schematic diagram of a deduplication filtering method according to an exemplary embodiment.

Refer to FIG. 18. The foregoing deduplication filtering method may include the following operations.

S1802. Obtain a transaction object.

S1804. Obtain a TxID in a transaction (a transaction unique key).

S1806. Call a filtering component to perform transaction deduplication judgment.

S1808. Obtain an in-process Bloom filter.

S1810. Lock the in-process Bloom filter.

S1812. Perform transaction deduplication verification through the Bloom filter.

S1814. Unlock the Bloom filter.

When S1814 is performed, S1816 is performed to summarize judgment results of the in-process Bloom filter.

If the transaction object exists in a summary result, S1818 is performed, to judge the transaction object through the ledger database.

If the transaction object does not exist in the summary result, S1820 is performed, to add the transaction object to the transaction pool.

S1822. Discarding ends.

In the technical solution provided in this embodiment, deduplication filtering may be accurately performed on the transactions to be uploaded to the blockchain.

Figure 19:
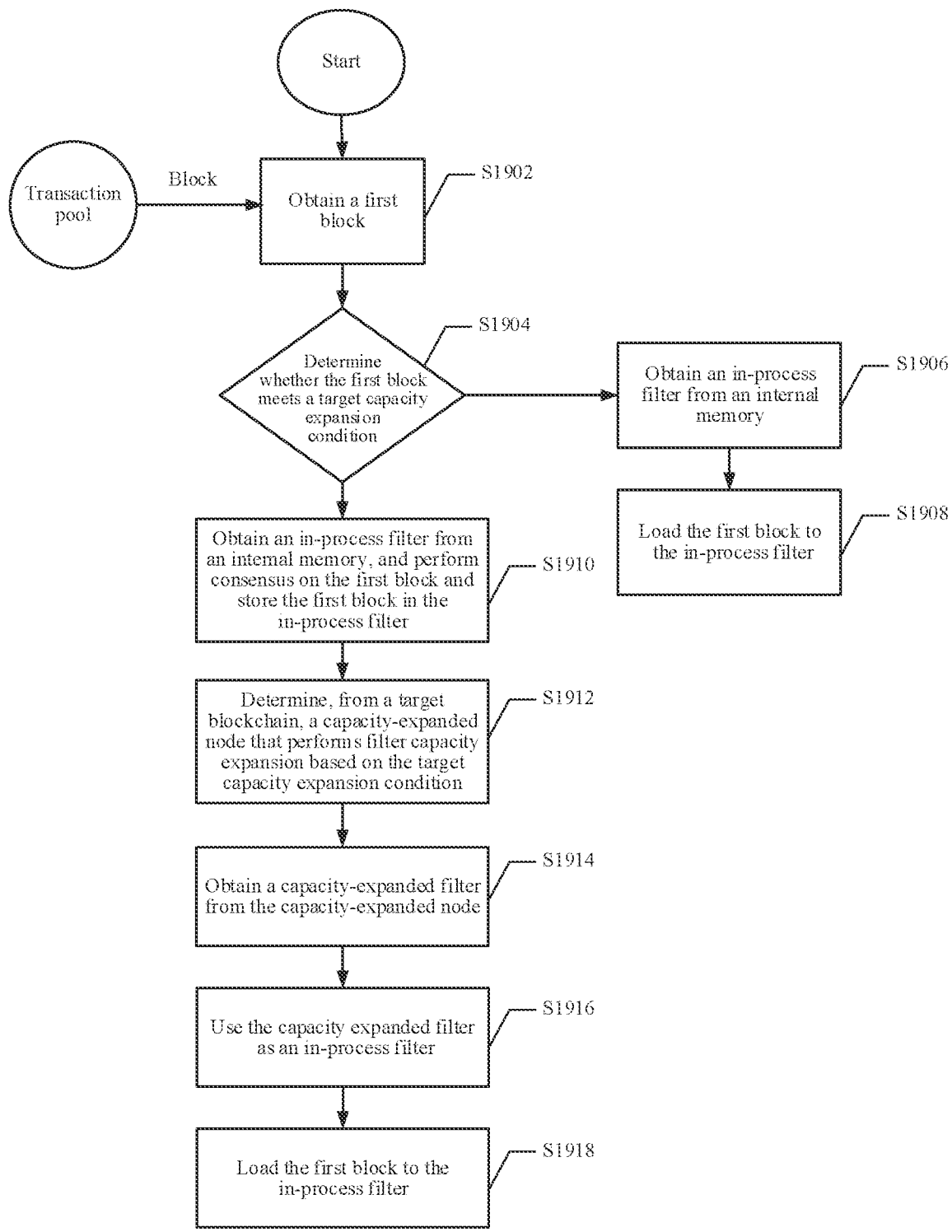
FIG. 19 is a schematic diagram of a deduplication filtering method according to an exemplary embodiment.

FIG. 19 is a schematic diagram of a deduplication filtering method according to an exemplary embodiment.

Refer to FIG. 19. The foregoing deduplication filtering method may include the following operations.

S1902. Obtain a first block.

S1904. Determine whether the first block meets a target capacity expansion condition.

S1906 is performed when it is determined that the first block does not meet the target capacity expansion condition, to obtain an in-process filter from an internal memory.

S1908. Load the first block to the in-process filter.

S1910 is performed when it is determined that the first block meets the target capacity expansion condition, to obtain an in-process filter from an internal memory, and store the first block in the in-process filter after consensus is performed on the first block.

S1912. Determine, from a target blockchain, a capacity-expanded node that performs filter expansion based on the target capacity expansion condition.

S1914. Obtain a capacity-expanded filter from the capacity-expanded node.

S1916. Use the capacity-expanded filter as an in-process filter.

S1918. Load the first block to the in-process filter.

In the foregoing embodiment, when the first block meets the first capacity expansion condition (that is, an error rate of the in-process filter reaches a threshold), one capacity-expanded filter is obtained from the first node of the blockchain and used as an in-process filter of the execution node, to perform deduplication filtering on transactions subsequently uploaded. Through the foregoing method, on one hand, when the first block meets the capacity expansion condition, the execution node may implement capacity expansion on the filter timely, and continue to perform deduplication filtering based on the capacity-expanded filter, to improve deduplication accuracy of the execution node. On the other hand, the capacity-expanded filter is constructed through using other nodes in the blockchain, which does not occupy resources of the execution node, and does not affect a service (for example, a deduplication filtering service) of the execution node. For those nodes having lower performance (for example, nodes having fewer cores), the deduplication accuracy is improved without affecting the service of the node itself. In addition, the filter may be uploaded and stored, so that the malicious behavior may be traced, thereby increasing costs of the malicious behavior of the node, and reducing the malicious behaviors of the node.

Figure 20:
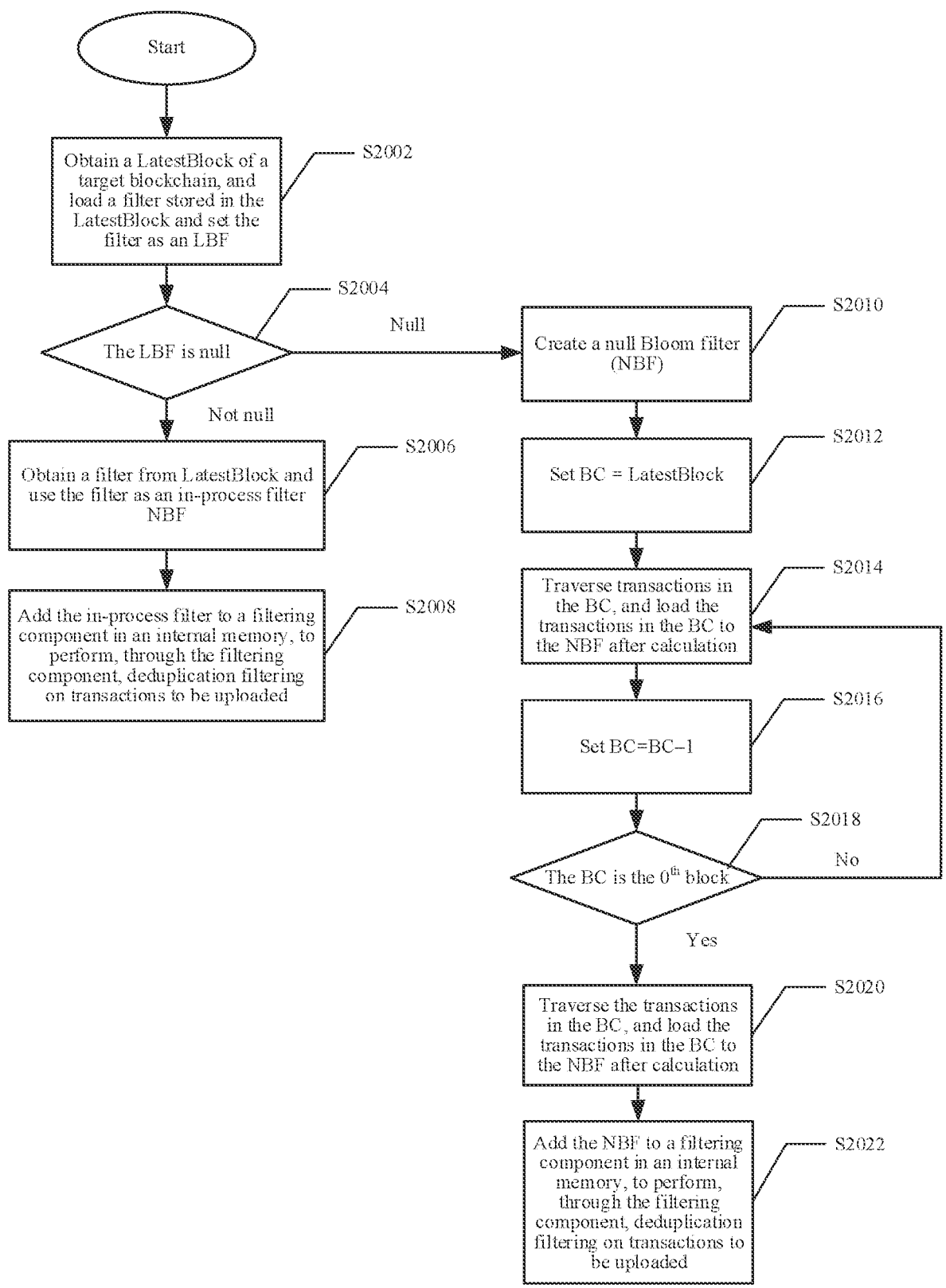
FIG. 20 is a flowchart of a method for reloading a filter according to an exemplary embodiment.

FIG. 20 is a flowchart of a method for reloading a filter according to an exemplary embodiment.

This embodiment provides a method for reloading a filter by using a node.

Refer to FIG. 20. The foregoing method for reloading a filter may include the following operations.

S2002. Obtain a LatestBlock of a target blockchain, and load a filter stored in the LatestBlock and set the filter as an LBF.

S2004. Determine that the LBF is null.

When the LBF is not null, S2006 is performed, to obtain a filter from the LatestBlock and use the filter as an in-process filter NBF.

S2008. Add the in-process filter to a filtering component in an internal memory, to perform, through the filtering component, deduplication filtering on transactions to be uploaded.

When the LBF is null, S2010 is performed to create a null Bloom filter (NBF).

S2012. Set BC=LatestBlock.

S2014. Traverse transactions in the BC, and load the transactions in the BC to the NBF after calculation.

S2016. Set BC=BC−1.

S2018. Determine whether the BC is the $0^{th}$ block.

When the BC is the $0^{th}$ block, S2020 is performed, the transactions in the BC are traversed and then are loaded to the NBF after calculation.

When the BC is not the $0^{th}$ block, S2022 is cyclically performed, the NBF is added to the filtering component in the internal memory, to perform, through the filtering component, deduplication filtering on the transactions to be uploaded.

After the foregoing operations are performed, the node may load the filter to the internal memory (the filtering component) after starting.

Based on the same inventive concept, an embodiment of the present disclosure further provides a transaction processing apparatus, which is illustrated below. Because the apparatus embodiment and the foregoing method embodiment have similar principles for resolving the problems, for implementation of the apparatus embodiment, reference may be made to the foregoing method embodiment. Repeated parts are not described again.

Figure 21:
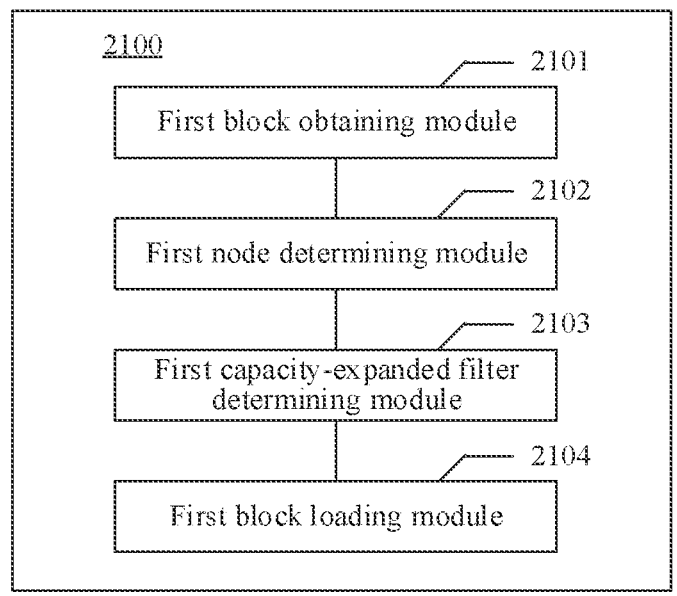
FIG. 21 is a block diagram of a transaction processing apparatus according to an exemplary embodiment.

FIG. 21 is a block diagram of a transaction processing apparatus according to an exemplary embodiment. Refer to FIG. 21. A transaction processing apparatus 2100 provided in embodiments of the present disclosure includes a first block obtaining module 2101, a first node determining module 2102, a first capacity-expanded filter determining module 2103, and a first block loading module 2104. The transaction processing apparatus 2100 may be an execution node on the blockchain.

The term "module" (and other similar terms such as unit, submodule, etc.) refers to computing software, firmware, hardware, and/or various combinations thereof. At a minimum, however, modules are not to be interpreted as software that is not implemented on hardware, firmware, or recorded on a non-transitory processor readable recordable storage medium. Indeed "module" is to be interpreted to include at least some physical, non-transitory hardware such as a part of a processor, circuitry, or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices. The modules can be implemented in software stored in memory or non-transitory computer-readable medium. The software stored in the memory or medium can run on a processor or circuitry (e.g., ASIC, PLA, DSP, FPGA, or any other integrated circuit) capable of executing computer instructions or computer code. The modules can also be implemented in hardware using processors or circuitry on the same or different integrated circuit.

The first block obtaining module 2101 may be configured to obtain a first block to be uploaded to the blockchain. The first node determining module 2102 may be configured to: when it is determined that the first block meets a first capacity expansion condition, determine, from nodes of the blockchain and based on the first capacity expansion condition, a first node for performing filter expansion. The first capacity-expanded filter determining module 2103 may be configured to obtain a first capacity-expanded filter from the first node, where a capacity of the first capacity-expanded filter is greater than a capacity of the first in-process filter in the execution node, and the first capacity-expanded filter is generated based on transactions having been uploaded to the blockchain. The first block loading module 2104 may be configured to load a transaction in the first block to the first capacity-expanded filter, and use the first capacity-expanded filter as a second in-process filter, to perform, through the second in-process filter, deduplication filtering on transactions to be uploaded to the blockchain.

The foregoing first block obtaining module 2101, the first node determining module 2102, the first capacity-expanded filter determining module 2103, and the first block loading module 210 correspond to S402 to S408 in the method embodiment. Examples and application scenarios implemented by the foregoing modules and the corresponding operations are the same, but are not limited to the content disclosed in the foregoing embodiments. The foregoing module, as a part of the apparatus, may be executed on a computer system, for example, a group of computer executable instructions.

In some embodiments, the transaction processing further includes: a first in-process filter obtaining module, a consensus module, and a storage module.

The first in-process filter obtaining module may be configured to obtain the first in-process filter from the internal memory of the execution node before using the first capacity-expanded filter as the second in-process filter. The consensus module may be configured to perform consensus on the first in-process filter when it is determined that the first block meets the first capacity expansion condition. The storage module may be configured to store the first in-process filter in the first block after the consensus is reached.

In some embodiments, the transaction processing apparatus may further include: a first in-process filter determining module and a first block loading module.

The first in-process filter determining module may be configured to obtain the first in-process filter from the internal memory of the execution node when it is determined that the first block does not meet the first capacity expansion condition. The first block loading module may be configured to load the transaction in the first block to the first in-process filter, to perform, through the first in-process filter, deduplication filtering on the transactions to be uploaded to the blockchain.

In some embodiments, the first node includes a first execution node, where the first capacity-expanded filter determining module 2103 may include: a first target capacity-expanded filter obtaining sub-module, a security detection sub-module, and a first capacity-expanded filter determining sub-module module.

The first target capacity-expanded filter obtaining sub-module may be configured to obtain the first target capacity-expanded filter from the first execution node. The security detection sub-module may be configured to perform security detection on the first target capacity-expanded filter. The first capacity-expanded filter determining sub-module module may be configured to use the first target capacity-expanded filter as the first capacity-expanded filter when it is determined that the first target capacity-expanded filter passes the security detection.

In some embodiments, the first node further includes a second execution node, where the first capacity-expanded filter determining module 2103 may include: a second target capacity-expanded filter obtaining sub-module, a second security detection sub-module, a second target capacity-expanded filter conversion module, a candidate capacity-expanded filter generation sub-module, and a candidate capacity-expanded filter conversion sub-module.

The second target capacity-expanded filter obtaining sub-module may be configured to obtain the second target capacity-expanded filter from the second execution node when it is determined that the first target capacity-expanded filter does not pass the security test. The second security detection sub-module may be configured to perform security detection on the second target capacity-expanded filter. The second target capacity-expanded filter conversion module may be configured to use the second target capacity-expanded filter as the first capacity-expanded filter when it is determined that the second target capacity-expanded filter passes the security detection. The candidate capacity-expanded filter generation sub-module may be configured to construct a candidate capacity-expanded filter based on the transactions having been uploaded to the blockchain when it is determined that the second target capacity-expanded filter does not pass the security detection. The capacity of the candidate capacity-expanded filter is equal to the capacity of the first target capacity-expanded filter. The candidate capacity-expanded filter conversion sub-module may be configured to use the candidate capacity-expanded filter as the first capacity-expanded filter.

In some embodiments, the security detection sub-module may include: a candidate capacity-expanded filter constructing unit and a security detection unit.

The candidate capacity-expanded filter constructing unit may be configured to construct a candidate capacity-expanded filter based on the transactions having been uploaded to the blockchain, and the capacity of the candidate capacity-expanded filter is equal to the capacity of the first target capacity-expanded filter. The candidate capacity-expanded filter performs security detection on the first target capacity-expanded filter through the candidate capacity-expanded filter.

In some embodiments, the security detection sub-module may include: an uploaded transaction obtaining unit, a virtual transaction constructing unit, and a second security detection unit.

The uploaded transaction obtaining unit may be configured to obtain at least one uploaded transaction from the blockchain. The virtual transaction constructing unit may be configured to randomly construct at least one virtual transaction. The second security detection unit may be configured to perform security detection on the first target capacity-expanded filter based on the at least one uploaded transaction and the at least one virtual transaction.

In some embodiments, the transaction processing apparatus may further include: a transaction obtaining sub-module and a first capacity-expanded filter constructing sub-module.

The transaction obtaining sub-module may be configured to obtain the transactions having been uploaded to the blockchain when the first capacity-expanded filter is not obtained from the first node. The first capacity-expanded filter constructing sub-module may be configured to construct the first capacity-expanded filter based on the transactions having been uploaded to the blockchain.

In some embodiments, the transaction processing apparatus may further include: a first transaction obtaining module, a deduplication filtering module, and a first judgment module.

The first transaction obtaining module may be configured to obtain the first transaction, where the first transaction includes the first transaction identifier. The deduplication filtering module may be configured to perform deduplication filtering on the first transaction identifier through the second in-process filter. The first judgment module may be configured to add the first transaction to the transaction pool of the blockchain when the second in-process filter determines that the first transaction identifier does not exist on the blockchain.

In some embodiments, the transaction processing apparatus may further include: a second judgment module, a third judgment module, and a fourth judgment module.

The second judgment module may be configured to perform deduplication judgment on the first transaction identifier through the ledger database of the blockchain when the second in-process filter determines that the first transaction identifier exists on the blockchain. The third judgment module may be configured to add the first transaction identifier to the transaction pool of the blockchain when it is determined, through the ledger database, that the first transaction identifier does not exist on the blockchain. The fourth judgment module may be configured to discard the first transaction when it is determined, through the ledger database, that the first transaction identifier exists on the blockchain.

In some embodiments, the transaction processing apparatus may further include: a second block obtaining module, a second in-process filter consensus module, a second node determining module, a second capacity-expanded filter obtaining module, and a second capacity-expanded filter loading module.

The second block obtaining module may be configured to obtain the second block to be uploaded. The second in-process filter consensus module may be configured to: when it is determined that the second block meets a second capacity expansion condition, perform consensus on the second in-process filter, and store the second in-process filter in the second block after the consensus is reached, where the first capacity expansion condition is different from the second capacity expansion condition. The second node determining module may be configured to determine, from the nodes of the blockchain and based on the second capacity expansion condition, a second node for performing filter expansion. The second capacity-expanded filter obtaining module may be configured to obtain the second capacity-expanded filter from the second node, where a capacity of the second capacity-expanded filter is larger than the capacity of the first capacity-expanded filter, the second capacity-expanded filter is generated by the second node based on the transactions having been uploaded to the blockchain, and the transactions having been uploaded to the blockchain include the transaction in the first block. The second capacity-expanded filter loading module may be configured to load a transaction in the second block to the second capacity-expanded filter and use the second capacity-expanded filter as a third in-process filter, to perform, through the third in-process filter, deduplication filtering on the transactions to be uploaded to the blockchain.

In some embodiments, the first node is an execution node; and the transaction processing apparatus may further include: a third block obtaining module and a simultaneous construction module.

The third block obtaining module may be configured to obtain the third block to be uploaded from the first node before obtaining the first capacity-expanded filter from the first node. The simultaneous construction module may be configured to load the third block to the first capacity-expanded filter while loading the third block to first in-process filter when it is determined that the third block does not meet the first capacity expansion condition, so that the first node constructs the first capacity-expanded filter while constructing the first in-process filter.

In some embodiments, the execution node is the second node that performs filter expansion based on the second capacity expansion condition. The transaction processing apparatus may further include: a fourth block obtaining module and a simultaneous construction module.

The fourth block obtaining module may be configured to obtain the fourth block to be uploaded after the first capacity-expanded filter is used as the second in-process filter. The simultaneous construction module may be configured to load the fourth block to the second in-process filter when it is determined that the fourth block meets the first capacity expansion condition but not the second capacity expansion condition. The fourth block is loaded into the second capacity-expanded filter, so that the second capacity-expanded filter is constructed while constructing the second in-process filter.

In some embodiments, the transaction processing apparatus may further include a capacity expansion condition modifying module. The capacity expansion condition modifying module is configured to:

obtain the actual error rate of the first in-process filter;

determine that the actual error rate of the first in-process filter is less than a target error rate;

generate a second transaction based on the actual error rate;

submit the second transaction to the blockchain, to perform consensus on the second transaction by the blockchain; and modify the first capacity expansion condition based on content in the second transaction after the consensus is reached.

Because each function of the apparatus 2100 is described in detail in its corresponding method embodiment. Details are not described herein again in the present disclosure.

A related module and/or a sub-module and/or a unit described in embodiments of this application may be implemented in a software manner, or may be implemented in a hardware manner. The described module and/or the sub-module and/or the unit may also be disposed in the processor. Names of the module and/or the sub-module and/or the unit do not constitute a limitation on the module and/or the sub-module and/or the unit in a case.

The flowcharts and block diagrams in the accompanying drawings show architectures, functions, and operations that may be implemented for the system, the method, and the computer program product according to embodiments of this application. In this regard, each box in a flowchart or a block diagram may represent a module, a program segment, or a part of code. The module, the program segment, or the part of code includes one or more executable instructions configured for implementing specified logic functions. In some implementations used as substitutes, functions annotated in boxes may alternatively be occur in a sequence different from that annotated in the accompanying drawings. For example, actually two boxes shown in succession may be performed basically in parallel, and sometimes the two boxes may be performed in a reverse sequence. This is determined by a related function. Each box in a block diagram or a flowchart and a combination of boxes in the block diagram and/or the flowchart may be implemented by using a dedicated hardware-based system configured to perform a specified function or operation, or may be implemented by using a combination of dedicated hardware and a computer instruction.

In addition, the foregoing drawings are only schematic illustrations of processing included in the methods according to the exemplary embodiments of the present disclosure, and are not intended to be limited. It is easy to understand that the processing shown in the accompanying drawings do not indicate or limit an order of time of processing. In addition, processing may be, for example, performed synchronously or asynchronously in a plurality of modules.

Figure 22:
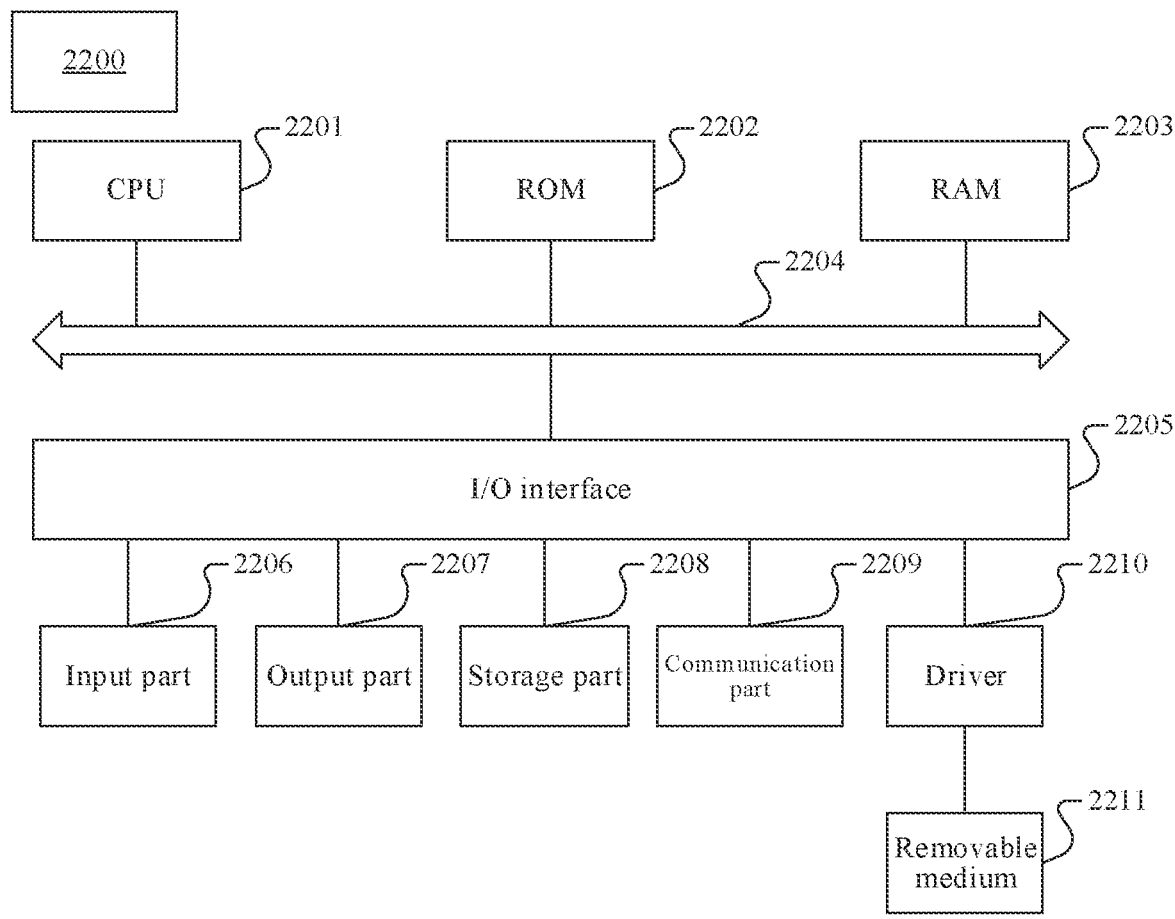
FIG. 22 is a schematic diagram of a structure of an electronic device suitable for implementing embodiments of the present disclosure.

FIG. 22 is a schematic diagram of a structure of an electronic device suitable for implementing embodiments of the present disclosure. The electronic device 2200 shown in FIG. 22 is only an example, and does not impose any limitation on functions and scopes of use of embodiments of the present disclosure.

As shown in FIG. 22, the electronic device 2200 includes a central processing unit (CPU) 2211 that can perform various proper actions and processing based on a program stored in a read-only memory (ROM) 2212 or a program loaded from a storage part 2218 into a random access memory (RAM) 2213. The RAM 2213 further stores various programs and data required to operate the electronic device 2200. The CPU 2211, the ROM 2212, and the RAM 2213 are connected to each other by using a bus 2214. An input/output (I/O) interface 2215 is also connected to the bus 2214.

The following parts are connected to the I/O interface 2215: an input part 2216 including a keyboard, a mouse, or the like; an output part 2217 including a cathode ray tube (CRT), a liquid crystal display (LCD), a speaker, or the like; the storage part 2218 including a hard disk; and a communication part 2219 including a network interface card such as a LAN card or a modem. The communication part 2219 performs communication processing by using a network such as the Internet. A driver 2210 is also connected to the I/O interface 2215 as required. A removable medium 2211 such as a magnetic disk, an optical disc, a magneto-optical disk, or a semiconductor memory is mounted on the driver 2210 as required, so that a computer program read from the removable medium 2211 is installed into the storage part 2218 as required.

Particularly, according to an embodiment of this disclosure, the processes described in the foregoing by referring to the flowcharts may be implemented as computer software programs. For example, embodiments of the present disclosure include a computer program product, and the computer program product includes a computer program carried on a computer-readable storage medium. The computer program includes program code configured for performing the methods shown in the flowcharts. In such an embodiment, by using the communication part 2219, the computer program may be downloaded and installed from a network, and/or installed from the removable medium 2211. When the computer program is executed by the central processing unit (CPU) 2211, the foregoing functions limited in the system of this application are executed.

The computer-readable storage medium shown in the present disclosure may be a computer-readable signal medium or a computer-readable storage medium, or any combination of the foregoing two. The computer-readable storage medium may be, for example, but is not limited to, an electrical, magnetic, optical, electromagnetic, infrared, or semiconductor system, apparatus, or device, or any combination thereof. More specific examples of the computer-readable storage medium may include, but not limited to: an electrical connection having one or more conductors, a portable disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In this application, the computer-readable storage medium may be any tangible medium that includes or stores a program, and the program may be used by or used in combination with an instruction executing system, an apparatus, or a device. However, in this application, a computer-readable signal medium may include a data signal that is propagated in a baseband or as part of a carrier carrying computer-readable program code therein. The propagated data signal may be in a plurality of forms, including but not limited to, an electromagnetic signal, an optical signal, or any suitable combination of the foregoing signals. The computer-readable signal medium may further be any computer-readable storage medium other than a computer-readable storage medium. The computer-readable storage medium may transmit, propagate or transmit a program intended for use by or in combination with an instruction execution system, an apparatus, or a device. The program code included on the computer-readable storage medium may be transmitted by using any suitable medium, including but not limited to: a wireless medium, a wired medium, an optical cable, an RF medium, or the like, or any suitable combination of the foregoing medium.

In addition, an embodiment of this application further provides a storage medium. The storage medium is configured to store a program, where the computer program is configured to perform the method according to the foregoing embodiments.

An embodiment of this application further provides a computer program product having a computer program. When the computer program product runs on a computer, the computer is enabled to perform the method in the foregoing embodiments.

The foregoing descriptions about implementations allow a person skilled in the art to understand that, example implementations described here may be implemented by using software, or may be implemented in a combination of software and hardware. Therefore, the technical solutions of embodiments of the present disclosure may be implemented in a form of a software product. The software product may be stored in a non-transitory storage medium (which may be a CD-ROM, a USB flash drive, a mobile hard disk, or the like) and includes several instructions for causing a computing device (which may be a personal computer, a server, a mobile terminal, or an intelligent device, or the like) to perform the method according to an embodiment of the present disclosure, for example, one or more of the operations shown in FIG. 4, FIG. 6, FIG. 8 to FIG. 12, FIG. 14, or FIG. 17 to FIG. 19.

After considering the specification and practicing the present disclosure, a person skilled in the art can easily conceive of other implementations of the present disclosure. The present disclosure is intended to cover any variation, use, or adaptive change of the present disclosure. These variations, uses, or adaptive changes follow the general principles of the present disclosure and include common general knowledge or common technical means, which are not disclosed in the present disclosure, in the art. The specification and the embodiments are considered as merely exemplary, and the real scope and spirit of the present disclosure are pointed out in claims.

The present disclosure is not limited to detailed structures, drawings, or implementation methods shown herein, but rather is intended to cover various modifications and equivalent arrangements included within the spirit and scope of the attached claims.

What is claimed is:

1. A transaction processing method, performed by an execution node on a blockchain, the method comprising:
   obtaining a first block to be uploaded to the blockchain;
   in response to determining that the first block meets a first capacity expansion condition, determining, from nodes of the blockchain and based on the first capacity expansion condition, a first node for performing filter expansion;
   obtaining a first capacity-expanded filter from the first node, a capacity of the first capacity-expanded filter being greater than a capacity of a first in-process filter in the execution node, and the first capacity-expanded filter being generated by the first node based on transactions having been uploaded to the blockchain; and
   loading a transaction in the first block to the first capacity-expanded filter, and using the first capacity-expanded filter as a second in-process filter, to perform, through the second in-process filter, deduplication filtering on transactions to be uploaded to the blockchain.

2. The method according to claim 1, wherein the method further comprises:
   obtaining the first in-process filter from an internal memory of the execution node;
   performing consensus on the first in-process filter in response to determining that the first block meets the first capacity expansion condition; and
   storing the first in-process filter in the first block after the consensus is reached.

3. The method according to claim 1, wherein the method further comprises:
   obtaining the first in-process filter from an internal memory of the execution node in response to determining that the first block does not meet the first capacity expansion condition; and
   loading the transaction in the first block to the first in-process filter, to perform, through the first in-process filter, deduplication filtering on the transactions to be uploaded to the blockchain.

4. The method according to claim 1, wherein the first node comprises a first execution node, and the obtaining the first capacity-expanded filter from the first node comprises:
   obtaining a first target capacity-expanded filter from the first execution node;
   performing security detection on the first target capacity-expanded filter; and
   using the first target capacity-expanded filter as the first capacity-expanded filter in response to determining that the first target capacity-expanded filter passes the security detection.

5. The method according to claim 4, wherein the first node further comprises a second execution node, and the obtaining the first capacity-expanded filter from the first node comprises:
   obtaining a second target capacity-expanded filter from the second execution node in response to determining that the first target capacity-expanded filter does not pass the security detection;
   performing the security detection on the second target capacity-expanded filter;
   using the second target capacity-expanded filter as the first capacity-expanded filter in response to determining that the second target capacity-expanded filter passes the security detection;
   constructing a candidate capacity-expanded filter based on the transactions having been uploaded to the blockchain in response to determining that the second target capacity-expanded filter does not pass the security detection, a capacity of the candidate capacity-expanded filter being equal to a capacity of the first target capacity-expanded filter; and
   using the candidate capacity-expanded filter as the first capacity-expanded filter.

6. The method according to claim 4, wherein the performing the security detection on the first target capacity-expanded filter comprises:
   constructing a candidate capacity-expanded filter based on the transactions having been uploaded to the blockchain, and a capacity of the candidate capacity-expanded filter being equal to a capacity of the first target capacity-expanded filter; and
   performing the security detection on the first target capacity-expanded filter based on the candidate capacity-expanded filter.

7. The method according to claim 4, wherein the performing the security detection on the first target capacity-expanded filter comprises:
obtaining at least one uploaded transaction from the blockchain;
randomly constructing at least one virtual transaction; and
performing the security detection on the first target capacity-expanded filter based on the at least one uploaded transaction and the at least one virtual transaction.

8. The method according to claim 1, wherein the method further comprises:
obtaining the transactions having been uploaded to the blockchain in response to failing to obtain the first capacity-expanded filter from the first node; and
constructing the first capacity-expanded filter based on the transactions having been uploaded to the blockchain.

9. The method according to claim 1, wherein the method further comprises:
obtaining a first transaction, the first transaction comprising a first transaction identifier;
performing deduplication filtering on the first transaction identifier through the second in-process filter; and
adding the first transaction to a transaction pool of the blockchain when the second in-process filter determines that the first transaction identifier does not exist on the blockchain.

10. The method according to claim 9, wherein the method further comprises:
performing deduplication judgment on the first transaction identifier through a ledger database of the blockchain when the second in-process filter determines that the first transaction identifier exists on the blockchain;
adding the first transaction identifier to the transaction pool of the blockchain in response to determining, through the ledger database, that the first transaction identifier does not exist on the blockchain; and
discarding the first transaction in response to determining, through the ledger database, that the first transaction identifier exists on the blockchain.

11. The method according to claim 1, wherein the method further comprises:
obtaining a second block to be uploaded;
in response to determining that the second block meets a second capacity expansion condition, performing consensus on the second in-process filter, and storing the second in-process filter in the second block after the consensus is reached, the first capacity expansion condition and the second capacity expansion condition being different;
determining, from the nodes of the blockchain and based on the second capacity expansion condition, a second node for performing filter expansion;
obtaining a second capacity-expanded filter from the second node, a capacity of the second capacity-expanded filter being greater than the capacity of the first capacity-expanded filter, the second capacity-expanded filter being generated by the second node based on the transactions having been uploaded to the blockchain, and the transactions having been uploaded to the blockchain comprising the transaction in the first block; and
loading a transaction in the second block to the second capacity-expanded filter, and using the second capacity-expanded filter as a third in-process filter, to perform, through the third in-process filter, deduplication filtering on the transactions to be uploaded to the blockchain.

12. The method according to claim 1, wherein the first node is the execution node, and the method further comprises:
obtaining a third block to be uploaded;
loading the third block to the first in-process filter in response to determining that the third block does not meet the first capacity expansion condition; and
loading the third block to the first capacity-expanded filter, so that the first node constructs the first capacity-expanded filter while constructing the first in-process filter.

13. The method according to claim 1, wherein the execution node is the second node that performs the filter expansion based on the second capacity expansion condition, and the method further comprises:
obtaining a fourth block to be uploaded;
loading the fourth block to the second in-process filter in response to determining that the fourth block meets the first capacity expansion condition but does not meet the second capacity expansion condition; and
loading the fourth block to the second capacity-expanded filter, to construct the second capacity-expanded filter while constructing the second in-process filter.

14. The method according to claim 1, wherein the method further comprises:
obtaining an actual error rate of the first in-process filter;
determining that the actual error rate of the first in-process filter is less than a target error rate of the first in-process filter;
generating a second transaction based on the actual error rate;
submitting the second transaction to the blockchain, to perform consensus on the second transaction by the blockchain; and
modifying the first capacity expansion condition based on content in the second transaction after the consensus is reached.

15. A transaction processing apparatus for an execution node on a blockchain, comprising:
a memory operable to store computer-readable instructions; and
a processor circuitry operable to read the computer-readable instructions, the processor circuitry when executing the computer-readable instructions is configured to:
obtain a first block to be uploaded to the blockchain;
in response to determining that the first block meets a first capacity expansion condition, determine, from nodes of the blockchain and based on the first capacity expansion condition, a first node for performing filter expansion;
obtain a first capacity-expanded filter from the first node, a capacity of the first capacity-expanded filter being greater than a capacity of a first in-process filter in the execution node, and the first capacity-expanded filter being generated by the first node based on transactions having been uploaded to the blockchain; and
load a transaction in the first block to the first capacity-expanded filter, and use the first capacity-expanded filter as a second in-process filter, to perform, through the second in-process filter, deduplication filtering on transactions to be uploaded to the blockchain.

16. The transaction processing apparatus according to claim 15, wherein the processor circuitry is further configured to:

obtain the first in-process filter from an internal memory of the execution node;

perform consensus on the first in-process filter in response to determining that the first block meets the first capacity expansion condition; and store the first in-process filter in the first block after the consensus is reached.

17. The transaction processing apparatus according to claim 15, wherein the processor circuitry is further configured to:

obtain the first in-process filter from an internal memory of the execution node in response to determining that the first block does not meet the first capacity expansion condition; and load the transaction in the first block to the first in-process filter, to perform, through the first in-process filter, deduplication filtering on the transactions to be uploaded to the blockchain.

18. The transaction processing apparatus according to claim 15, wherein the first node comprises a first execution node, and the processor circuitry is configured to:

obtain a first target capacity-expanded filter from the first execution node;

perform security detection on the first target capacity-expanded filter; and use the first target capacity-expanded filter as the first capacity-expanded filter in response to determining that the first target capacity-expanded filter passes the security detection.

19. The transaction processing apparatus according to claim 15, wherein the processor circuitry is further configured to:

obtain the transactions having been uploaded to the blockchain in response to failing to obtain the first capacity-expanded filter from the first node; and construct the first capacity-expanded filter based on the transactions having been uploaded to the blockchain.

20. A non-transitory machine-readable media, having instructions stored on the machine-readable media, the instructions configured to, when executed, cause a machine to:

obtain a first block to be uploaded to a blockchain;

in response to determining that the first block meets a first capacity expansion condition, determine, from nodes of the blockchain and based on the first capacity expansion condition, a first node for performing filter expansion;

obtain a first capacity-expanded filter from the first node, a capacity of the first capacity-expanded filter being greater than a capacity of a first in-process filter in an execution node, and the first capacity-expanded filter being generated by the first node based on transactions having been uploaded to the blockchain; and load a transaction in the first block to the first capacity-expanded filter, and use the first capacity-expanded filter as a second in-process filter, to perform, through the second in-process filter, deduplication filtering on transactions to be uploaded to the blockchain.

* * * * *